(12) United States Patent
Jolly et al.

(10) Patent No.: US 11,846,318 B2
(45) Date of Patent: Dec. 19, 2023

(54) ROTATABLE SHAFT BEARING WITH ELECTROMAGNETICALLY CONTROLLED SUPPORT IMPEDANCE

(71) Applicant: LORD Corporation, Cary, NC (US)

(72) Inventors: Mark R. Jolly, Raleigh, NC (US); Victor M. Zaccardo, Durham, NC (US); Paul R. Black, Apex, NC (US); Daniel E. Kakaley, Cary, NC (US); Russell E. Altieri, Holly Springs, NC (US)

(73) Assignee: LORD Corporation, Cary, NC (US)

( * ) Notice: Subject to any disclaimer, the term of this patent is extended or adjusted under 35 U.S.C. 154(b) by 36 days.

(21) Appl. No.: 17/625,472

(22) PCT Filed: Feb. 6, 2020

(86) PCT No.: PCT/US2020/016955
§ 371 (c)(1),
(2) Date: Jan. 7, 2022

(87) PCT Pub. No.: WO2021/006931
PCT Pub. Date: Jan. 14, 2021

(65) Prior Publication Data
US 2022/0290718 A1 Sep. 15, 2022

Related U.S. Application Data

(60) Provisional application No. 62/872,963, filed on Jul. 11, 2019.

(51) Int. Cl.
*F16C 27/04* (2006.01)
*F16C 32/04* (2006.01)
(Continued)

(52) U.S. Cl.
CPC .......... *F16C 27/045* (2013.01); *F01D 25/164* (2013.01); *F16C 19/06* (2013.01);
(Continued)

(58) Field of Classification Search
CPC ...... F16C 19/06; F16C 27/045; F16C 27/066; F16C 32/0402; F16C 32/044;
(Continued)

(56) References Cited

U.S. PATENT DOCUMENTS 5,977,677 A * 11/1999 Henry ................. F16C 32/0402
310/90
6,590,366 B1 * 7/2003 Browning ........... F16C 32/0451
310/90.5
(Continued)

FOREIGN PATENT DOCUMENTS

CN 101 799 044 B 8/2010
EP 1 972 410 A1 9/2008
(Continued)

OTHER PUBLICATIONS

EP3444478_A1_DESCRIPTION.*
(Continued)

*Primary Examiner* — Phillip A Johnson
(74) *Attorney, Agent, or Firm* — KDW FIRM PLLC

(57) ABSTRACT

A system for controlling shaft displacement within a support structure, the system having a rotatable shaft, at least one bearing supporting the shaft, the at least one bearing having an inner race rotatable along with the shaft and an outer race circumferentially surrounding the inner race, an electromagnet assembly positioned about the shaft along a longitudinal axis thereof, and a controller that detects a radial motion of the shaft and determines a corrective force to reduce the radial motion of, or a parameter related to, the shaft, the controller commanding the electromagnet assembly to gen-
(Continued)

erate the corrective force to act on the shaft, the electromagnet assembly having a plurality of phases spaced circumferentially about the shaft, the controller commanding different phases of the electromagnet assembly to generate the corrective force so that a vector of the corrective force rotates about the longitudinal axis of the shaft.

26 Claims, 19 Drawing Sheets

(51) Int. Cl.
  *F01D 25/16* (2006.01)
  *F16C 19/06* (2006.01)
  *F16F 15/023* (2006.01)
(52) U.S. Cl.
  CPC ...... *F16C 32/0402* (2013.01); *F16F 15/0237* (2013.01); *F05D 2240/54* (2013.01); *F05D 2260/96* (2013.01); *F16C 2360/23* (2013.01)
(58) Field of Classification Search
  CPC .............. F16C 32/0444; F16C 32/0446; F16C 32/0451; F16C 32/0453; F16C 32/0455; F16C 32/0457; F16C 39/06; F16C 39/063; F16C 39/066; F16C 2360/23; F01D 25/164; F05D 2240/511; F05D 2240/515; F05D 2240/54; F05D 2260/96; F16F 15/0237; F16F 15/18; H02K 7/09
  See application file for complete search history.

(56) References Cited

U.S. PATENT DOCUMENTS

| | | | |
|---|---|---|---|
| 2002/0047400 A1* | 4/2002 | Ueyama | F16C 32/0442 310/90.5 |
| 2006/0208589 A1 | 9/2006 | Foshage et al. | |
| 2011/0123328 A1* | 5/2011 | Henry | F04D 19/048 415/229 |
| 2012/0212111 A1* | 8/2012 | Tonoli | F16F 15/18 310/68 R |
| 2012/0217904 A1* | 8/2012 | Tonoli | F16F 15/002 318/114 |
| 2015/0260221 A1* | 9/2015 | Anders | F16C 33/586 29/598 |
| 2017/0058697 A1 | 3/2017 | Copeland et al. | |

FOREIGN PATENT DOCUMENTS

| | | |
|---|---|---|
| EP | 3 444 478 A1 | 2/2019 |
| JP | 3267649 B2 * | 5/1993 |
| WO | WO 2010/133333 A1 | 11/2020 |

OTHER PUBLICATIONS

International Search Report for Application No. PCT/US2020/016955 dated May 27, 2020.
Looser A. et al., "A hybrid bearing concept for high-speed applications employing aerodynamic gas-bearing and self-sensing active magnetic damper," IECON 2011—37th Annual Conference on IEEE Industrial Electronics Society, Nov. 7, 2011.

* cited by examiner

ROTATABLE SHAFT BEARING WITH ELECTROMAGNETICALLY CONTROLLED SUPPORT IMPEDANCE

CROSS-REFERENCE TO RELATED APPLICATIONS

This application claims priority to U.S. Provisional Patent Application Ser. No. 62/872,963, filed Jul. 11, 2019, the disclosure of which is incorporated herein by reference in its entirety.

TECHNICAL FIELD

The subject matter disclosed herein relates to a system for supporting and controlling the rotary motions of a rotating shaft. In particular, the presently disclosed subject matter relates to a system for damping oscillatory vibrations and displacements of rotating shafts, as well as associated methods of use to reduce the transmission of forces and vibrations between the shaft and a base structure or vehicle.

BACKGROUND

Rotating machines are used in many applications, such as jet engines, compressors, turbines, power stations, automobiles, machine tools, heavy machinery, oil-gas extraction equipment, and marine propulsion, to name but a few such examples. In such applications, a wide variety of instances of undesirable rotor dynamic vibration may occur, each posing challenges unique to the particular application. One such type of unwanted vibration can be referred to generally as radial, or lateral, vibration.

Lateral rotor vibrations (LRV) are one of the primary rotordynamic problems encountered during the design of high speed machinery. LRV is defined as shaft vibration perpendicular to the axis of rotation and is the largest vibration component in most machinery of this kind. While it is an important consideration in many types of high speed machinery, LRV is of particular concern in turbo-electrical machines such as, for example, compressors, pumps, steam turbines, combustion gas turbine generators, gas turbine jet engines, turbochargers, and electric motors. The primary method by which LRV occurs originates due to rotor imbalance, which is present in all real-world machines to at least some degree. While it may be possible to minimize rotor imbalance, it is impossible to eliminate it entirely. The consequences of LRV can range from increased bearing wear, to, in extreme cases, frictional contact, or rubbing, between the rotor and stator, rotor crack formation and propagation, and, ultimately, rotor failure. As such, it has been traditionally necessary for designers of such high speed machinery to avoid designing a machine that would be operated at or around critical speeds and also to design for sufficient rotor-stator clearance to accommodate traversing the critical speeds, sometimes referred to as natural frequencies, at which LRV increases.

Lateral rotor vibrations (LRV) are one of the primary rotordynamic problems encountered when designing high speed machinery. FIG. 9 shows a common solution to minimizing critical-induced LRV among aviation gas turbines, in which vibration reducing system, generally designated 102, incorporates a squeeze film damper (SFD), generally designated 300, in series with a traditional ball bearing, generally designated 120, supporting a shaft 110. Such an SFD 300 adds compliance and damping to the bearing 120 and comprise the stationary engine housing 310A and a bearing cartridge assembly 310B. The cartridge assembly 310B is free to translate but is fixed rotationally by an anti-rotation pin 312. The housing 310A contains an oil passage 320 on top which guides pressurized oil into a cylindrical oil feed groove, generally designated 324, which in turn distributes pressurized oil to the squeeze gaps, generally designated 326, around the annulus of the cartridge assembly 310B. Oil is circulated through the SFD 300 via the oil passage 320 in the top and a drain in the bottom. The oil can be contained in the squeeze gap 326 in a multitude of ways, but in the example embodiment shown herein, the SFD 300 includes O-rings 330 for oil containment and also for providing a centering stiffness.

The use of the SFD 300 in the system 102 produces a boundary condition for the shaft 110 that can be modeled as a spring and damper in parallel, with the O-ring 330 contributing stiffness and the squeeze film of pressurized oil between the housing 310A and the cartridge assembly 310B accounting for damping radial displacements of the shaft 110. Radial displacement of the cartridge assembly 310B relative to the housing 310A results in reduced squeeze film thickness on one side of the SFD 300 and increased thickness on the other, forcing the oil in the squeeze gap 326 to flow around the annulus of the SFD 300. The viscous and inertial effects of this flow add damping to the system 102, resulting in a reduction of both critical-induced and steady-state rotor LRV, if the appropriate level of damping is selected.

To maximize the reduction in LRV, in the system 102, the correct amount of damping must be designed into the SFD 300. If too little damping is provided by the SFD 300, the shaft 110 and bearing 120 will still exhibit excess LRV. However, if excessive damping, or overdamping, is provided by the SFD 300, the system 102 will exhibit characteristics of a rigidly suspended shaft 110 and bearing 120, and will thus not act to reduce LRV levels. As such, good design tools are critical to successfully implementing SFDs. Unfortunately, SFDs are difficult to model and pose significant design challenges. Theoretical models exist but often fail to consider nonlinear factors, such as end seal compliance, tribological effects, dynamic cavitation, and cross-coupling terms between axes of movement. Thus, the design process for implementing systems, such as system 102, having an SFD 300 is an iterative process that requires constructing and testing a physical prototype and iterating the design process until satisfactory results are obtained. Not only does this process increase research and design costs, but it also lengthens the development cycle for new high-speed rotary machines, such as, for example, turbine engines.

Additionally, due to the passive nature of the designs in an SFD 300, the performance of the SFD 300 is a function of not only design parameters, such as, for example, length, diameter, and radial clearance, but also is a function of operating conditions of the engine and other environmental factors. Examples of such factors can include the oil pressure, oil flowrate through the damper, effects of end seals, and fluid properties, such as viscosity and density, both of which are a function of oil temperature and life, e.g., how long the oil has been in service. The passive nature of such an SFD 300 also inherently results in radial movement at the bearings at all times during engine operation, not only during times when the shaft 110 and bearing 120 are accelerating through critical speeds. Due to this substantially omnipresent radial movement, designers must generally add additional rotor tip clearance, which is detrimental to specific fuel consumption of such an engine.

All systems with rotary components have, at least to some degree, a residual unbalance force induced during the manufacturing process and/or the assembly of the rotary components. Furthermore, even a rotary system that is initially well balanced may begin to wear unevenly and exhibit unbalanced vibrational characteristics as the uneven wear pattern increases during use. By way of example, thermal gradients normally present in turbo machinery can cause a rotary shaft to warp; another example is that erosion of the blades can alter the balance of the initially well-balanced rotor assembly. In extreme situations, a piece of a rotor blade, or even an entire rotor blade, can become detached from the rest of the rotary assembly, leading to a very large unbalance force being generated until a repair is completed. These unbalance forces can pose particularly severe vibrational forces to the safe functioning of the rotary system if the normal operation speed of the rotor assembly passes through or operates near a critical speed (e.g., a resonant frequency) of the rotary assembly.

Another concern presented by radial vibrations generated in high speed rotary machinery is the onset of rotor dynamic instability. In some cases, the high levels of kinetic energy stored in such rotor systems can be transferred from rotational energy into vibration energy. This can happen through any of a plurality of mechanisms and interactions between components, including internal damping, aerodynamic cross-coupling, seals, high-speed journal bearings, and inter-shaft squeeze film dampers. Such induced rotor vibration leads to accelerated fatigue of structural components and can cause rubbing or excessive wear of close fitting components. Furthermore, uncontrolled rotary vibration may be amplified by critical speeds and/or other rotational instability during normal operation, which can even result in the destruction of the machine itself.

There has been research into the replacement of SFDs with electromechanical solutions to reduce design complexity and increase performance, but each has so far been unworkable. Some have tried adding damping at the point of largest deflection of the shaft using active magnetic dampers (AMDs), but this is generally impractical because the work-producing components usually coincide at such locations. Attempts have also been made to replace conventional SFDs with piezo-electric actuators, shape-memory alloys, electro-rheological fluid based SFDs, magneto-rheological based SFDs, and passive magnetic means of damping. However, to date there have been no known successful applications of active control to an electromagnetic actuator that is located at a bearing. An AMD, similar in construction to an active magnetic bearing (AMB), example embodiments of which are shown in the figures of this application and described with respect thereto, were designed and mounted to a high-speed test stand. It was shown that active control using an AMD can reduce LRV that is induced due to operation at or adjacent a critical speed by about 80% over an undamped system.

As such, it is advantageous for a system to actively generate forces to compensate for radial vibrations in rotating machinery, using one or more electromagnetic motors configured to produce both radially-directed force loads.

SUMMARY

In one aspect, a system for controlling shaft displacement within a support structure is provided, the system comprising: a rotatable shaft; at least one bearing supporting the shaft, wherein the at least one bearing comprises an inner race rotatable along with the shaft and an outer race circumferentially surrounding the inner race; an electromagnet assembly positioned about the shaft along a longitudinal axis thereof; and a controller configured to detect a radial motion of the shaft and determine a corrective force to reduce the radial motion of, or a parameter related to, the shaft, the controller being configured to command the electromagnet assembly to generate the corrective force to act on the shaft, wherein the electromagnet assembly comprises a plurality of phases spaced circumferentially about the shaft, the controller being configured to command different phases of the electromagnet assembly to generate the corrective force so that a vector of the corrective force rotates about the longitudinal axis of the shaft.

In some embodiments of the system, the electromagnet assembly is axially proximate to the bearing along the shaft.

In some embodiments of the system, the electromagnet assembly is arranged circumferentially around an outer perimeter of the bearing to define a gap between the electromagnet assembly and the bearing, the electromagnet assembly being configured to generate a magnetic field that causes the corrective force to act on the outer race of the bearing.

In some embodiments of the system, the electromagnet assembly is coplanar with the bearing.

In some embodiments, the system comprises a magnetically responsive collar rigidly attached to an outer perimeter of the bearing, wherein the electromagnet assembly is arranged circumferentially around an outer perimeter of the collar to define a gap between the electromagnet assembly and the collar, the electromagnet assembly being configured to generate a magnetic field that causes the corrective force to act on the collar.

In some embodiments, the system comprises a magnetically responsive collar having a first portion, which is axially aligned with the bearing to rigidly attach the collar to the bearing, and a second portion, which extends away from the first portion of the collar along the longitudinal axis of the shaft, wherein the electromagnet assembly is axially offset from the first portion of the collar and the bearing and axially proximate to, and arranged circumferentially around an outer perimeter of, the second portion of the collar to define a gap between the electromagnet assembly and the collar, the electromagnet assembly being configured to generate a magnetic field that causes the corrective force to act on the second portion of the collar.

In some embodiments of the system, the corrective force comprises a coupled radial force and moment acting on the shaft.

In some embodiments of the system, the collar comprises a third portion, which extends away from the first portion along the longitudinal axis of the shaft in a direction opposite that in which the second portion extends away from the first portion, wherein the electromagnetic assembly is a first electromagnet assembly, the system comprising a second electromagnet assembly that is axially proximate to, and arranged circumferentially around an outer perimeter of, the third portion of the collar.

In some embodiments of the system, the first electromagnet assembly and the second electromagnet assembly are positioned on opposite sides of the bearing, relative to a longitudinal axis of the shaft, so that the first electromagnet assembly and the second electromagnet assembly are configured to generate radial forces and moments on the shaft independent of each other.

In some embodiments of the system, the electromagnet assembly is axially offset from the bearing.

In some embodiments, the system comprises a magnetically responsive collar rigidly attached to an outer perimeter of the shaft, wherein the electromagnet assembly is arranged circumferentially around an outer perimeter of the collar to define a gap between the electromagnet assembly and the collar, the electromagnet assembly being configured to generate a magnetic field that causes the corrective force to act on the collar.

In some embodiments of the system, the electromagnet assembly is arranged circumferentially about the shaft to define a gap between the electromagnet assembly and the shaft, the electromagnet assembly being configured to generate a magnetic field that causes the corrective force to act directly on the shaft.

In some embodiments of the system, the electromagnetic assembly is a first electromagnet assembly, the system comprising a second electromagnet assemblies located a distance along the longitudinal axis of the shaft from the first electromagnet assembly, the second electromagnet assembly being configured to exert a corrective force on the shaft.

In some embodiments of the system, the first electromagnet assembly and the second electromagnet assembly are positioned on opposite sides of the bearing, relative to a longitudinal axis of the shaft, so that the first electromagnet assembly and the second electromagnet assembly are configured to generate radial forces and moments on the shaft independent of each other.

In some embodiments of the system, the electromagnet assembly has a magnetic circuit that is isolated from the bearing.

In some embodiments of the system, the controller is configured to adaptively modify a magnitude and a phase of the corrective force.

In some embodiments, the system comprises a passive damper comprising a liquid squeeze film damper arranged between the electromagnet assembly and the shaft and/or the outer race.

In some embodiments of the system, the passive damper comprising a viscous fluid disposed between the electromagnet assembly and the shaft and/or the outer race.

In some embodiments of the system, the corrective force is configured to produce a controllable radial force and/or moment.

In some embodiments of the system, the compliant element is a configured to be a fail-safe capable of providing damping when the electromagnet assembly fails.

In some embodiments, the system comprises a compliant element positioned between the outer race and the support structure, wherein the compliant element is configured to produce a spring-like force on the outer race.

In some embodiments of the system, the compliant element includes an elastomer arranged between the outer race and the support structure.

In some embodiments of the system, the compliant element includes a metallic spring.

In some embodiments, the system comprises a tachometer configured to detect a rotational speed and position of the shaft.

In some embodiments of the system, the vector of the corrective force rotates about the longitudinal axis of the shaft at a rate that is a multiple of a rotation rate of the shaft.

In some embodiments of the system, the system is a self-sensing active magnetic damper.

In some embodiments, the system comprises at least one sensor configured to detect the motion of the shaft, wherein the controller is configured to receive signals from the at least one sensor to detect a radial motion of the shaft.

In some embodiments of the system, the outer race and/or the shaft comprise permanent magnets, so that the corrective force can be an attractive force and/or a repulsive force.

DETAILED DESCRIPTION

This disclosure relates to vibration reducing devices and systems for use on machinery having one or more rotatable shafts located therein, as well as methods for reducing vibrations induced by imbalances in such shafts during their rotation. Machinery having such rotatable shafts that rotate during normal operation often must operate through or near dynamic shaft modes that result in significant radial shaft vibration. Such radial vibrations can lead to undesirable characteristics, including induced machinery vibration, excessive bearing loads, and ensuring proper rotating clearances. Historically, damping mechanisms have been incorporated into the shaft support bearings to attenuate shaft vibration. These mechanisms may include elastomeric foundations for the bearing and/or squeeze film dampers between the bearing outer race and the bearing housing. An example of such previous solutions can be found in U.S. Pat. No. 5,603,574, the contents of which are incorporated herein by reference. While elastomeric foundations and squeeze film dampers may be effective at attenuating shaft vibrations, these solutions present significant disadvantages in terms of allowing more overall motion of the rotating elements. This is particularly disadvantageous in mobile machinery, such as aircraft turbofan and turboprop engines, in that additional rotating clearance must be designed into such designs to accommodate bearing damper radial motion during inertial maneuvers.

The present invention is a compliantly mounted bearing for a rotatable shaft, the mounting compliance characteristics of which can be actively modified by an electromagnet assembly capable of imposing a controllable rotating radial force, whether through the bearing or, in some embodiments, directly to the shaft. The features of the invention are described in more detail hereinbelow, followed by several operational scenarios that highlight the advantages of this invention and demonstrate how this invention can improve the aforementioned deficiencies known from the prior art.

The present invention is based on the art of active magnetic bearings (AMB). AMBs typically use pairs of electromagnets to levitate high-speed ferromagnetic rotary elements and are typically employed in systems where bearing wear and maintenance are problematic. AMBs also have the ability to actively control rotor dynamics through the bearings. Some examples where AMBs may be used include, but are not limited to, turbo machinery, machine tools, instruments in space, and vibration isolation.

Figure 1:
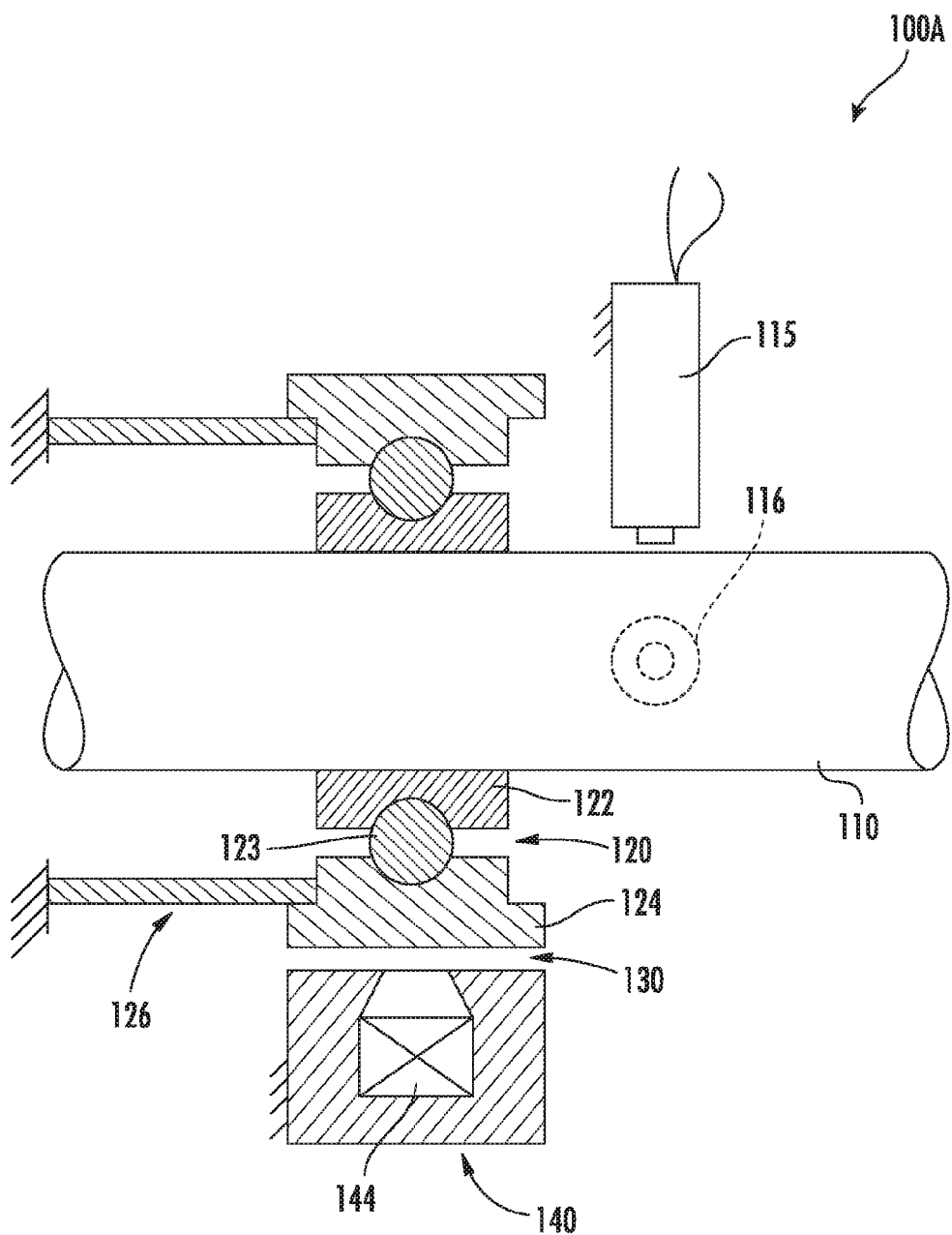
FIG. 1 schematically shows an example embodiment of a radial movement control system.

FIG. 1 shows a portion of a first example embodiment of a vibration control system, generally designated 100A, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. In some embodiments, the compliant element 126 is an elastomer arranged between the outer race 124 and the housing of the rotary machine. In some such embodiments, the elastomer is in the form of one or more O-rings, which provide mostly stiffness and a comparatively small degree of damping. The bearing 120 can be of any suitable type, including, for example, a fluid film, ball bearing, duplex bearing, or roller bearing. In the embodiment shown, the electromagnet 140 surrounds the bearing 120 and is spaced apart from the outer race 124 of the bearing 120 by a gap, generally designated 130, so as to exert radially-oriented magnetic corrective forces, for example, $f_{m0}$, $f_{m1}$, $f_{m2}$ in FIG. 3, on the bearing 120 and, hence, the shaft 110 to which the bearing 120 is attached. In some embodiments, the compliant element 126 is in the form of or includes a passive damper, which can have a viscous fluid disposed within a portion of the gap 130.

In the embodiment of FIG. 1, the outer race 124 of the bearing 120 is magnetically reactive and acts as a part of the magnetic circuit used to generate the corrective forces to counteract the vibration and/or radial displacements of the shaft 110 during operation of the rotary machine. The electromagnet 140 has a plurality of phases 144, or coils, such that sequencing current to each of the plurality of phases 144 can result in a rotating radially-oriented corrective force. In some embodiments, the electromagnet 140 has three or more phases. In some other embodiments, the electromagnet 144 has four phases.

The system 100A has a first motion sensor 115 and a second motion sensor 116, both of which are arranged radially about the shaft at a 90° offset from each other about the shaft. In the embodiment shown, the first motion sensor 115 and the second motion sensor 116 are arranged so as to be substantially coplanar with each other or, stated differently, are arranged at substantially a same position along the length of the shaft 110. The first and second motion sensors 115, 116 are, as shown, proximity sensors that measure the position, displacement, movement, and/or motion of the shaft 110 in the radial direction for use as control feedback sensors to modulate the corrective forces being generated. The first and second motion sensors 115, 116 can be any suitable type of sensor that is capable of detecting the radial position, displacement, movement, and/or motion of the shaft 110 relative to, e.g., towards and away from, the first and second motion sensors 115, 116. The first and second motion sensors 115, 116 are arranged at fixed positions about the shaft 110, such that the first and second motion sensors 115, 116 are rigidly attached about the shaft 110 so as to be substantially immobile, relative to either of the axial or radial directions of the shaft 110. The AMD may also be used as the sensing element, using a self-sensing technique known to those skilled in the art of active magnetic bearings The first motion sensor 115 is located near the shaft 110 to measure a value that correlates to, or is, a distance between the first motion sensor 115 and an outer circumferential surface of the shaft 110 in the plane in which the first motion sensor 115 is arranged, the distance measured being defined by the radial motion of the shaft 110. The second motion sensor 116 is located near the shaft 110 to measure a value that correlates to, or is, a distance between the second motion sensor 116 and an outer circumferential surface of the shaft 110 in the plane in which the second motion sensor 116 is arranged, the distance measured being defined by the radial motion of the shaft 110. The first and second motion sensors 115, 116 may be, by way of example and not limitation, accelerometers, pressure sensors, and/or proximity sensors, or combinations thereof. In some embodiments, the first and second motion sensors 115, 116 may be remote sensors that measure physical behavior(s) that result from rotation of the shaft 110, such as remote microphones or remote accelerometers. In some embodiments, one or both of the first and second sensors 115, 116 could be replaced and/or augmented with microphones within an aircraft cabin that measure acoustic parameters resulting from imbalanced motion of the shaft 110. In some embodiments, the AMD can act as its own sensor, such that the AMD is self-sensing.

Figure 2:
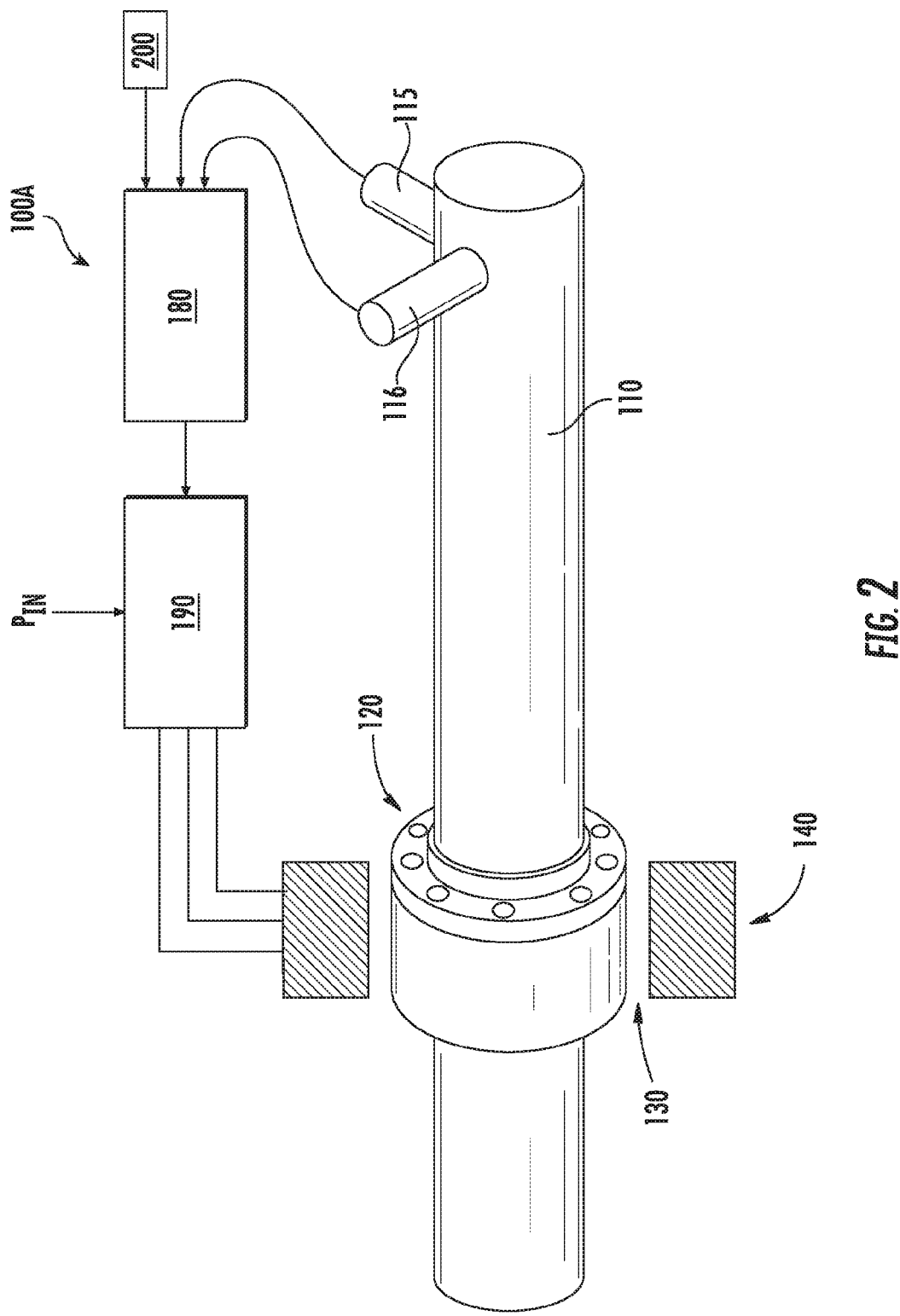
FIG. 2 schematically shows an embodiment of a control system for the radial movement control system of FIG. 1.

FIG. 2 further shows aspects of the example vibration control system 100A of FIG. 1. The first and second motion sensors 115, 116 are arranged about the shaft 110 and radially offset from each other. The first and second motion sensors 115, 116 are electrically connected to a controller 180 to provide an input value corresponding to a distance of each of the first and second motion sensors 115, 116 from the shaft 110 in substantially real-time to the controller 180. The controller 180 also receives a signal from a tachometer 200 as an input to indicate the angular speed at which the shaft 110 is rotating. In some embodiments, the input from the tachometer 200 can be omitted and the angular speed of the shaft 110 may be derived directly from the first and second motion sensors 115, 116, e.g., by observing fiducials of the shaft 110 as it rotates.

The controller 180 receives the input signals from the tachometer 200 and the first and second motion sensors 115, 116 and performs signal processing, such as a multi-tap infinite impulse response (IIR) or finite impulse response (FIR) filtering, demodulation, Fast Fourier Transform (FFT), or a Discrete Fourier Transform (DFT), to extract relevant corresponding frequency components from the input signals from the tachometer 200 and the first and second motion sensors 115, 116. The controller 180 then computes parameters associated with the corrective force(s) required to counteract the detected/derived rotary imbalance of the shaft 110 based on the inputs from the tachometer 200 and/or the first and second motion sensors 115, 116. The parameters computed can include one or more of a magnitude, a phase, a frequency, and a direction of the corrective force required to negate or counteract, at least partially, the imbalanced motions of the shaft 110. The controller 180 then sends a force command, which can include the computed parameters, to a power amplifier 190. The power amplifier 190 receives an input power $P_{IN}$ and sends a current corresponding to the amplified corrective force to each phase of the electromagnet 140. In some embodiments, the corrective force is a controllable moment. It is advantageous for the controller 180 and the power amplifier 190 to be configured to send a same or a different current to each phase of the electromagnet 140.

Adaptation methods, such as Filtered-X LMS, can receive the processed sensor signals and adaptively modify the magnitude and phase of the current signals provided to the electromagnet 140, such that values measured by the first and second motion sensors 115, 116 evolve toward desired values. Typically, it is advantageous for the values measured by the first and second motion sensors 115, 116 to be minimized.

Figure 3:
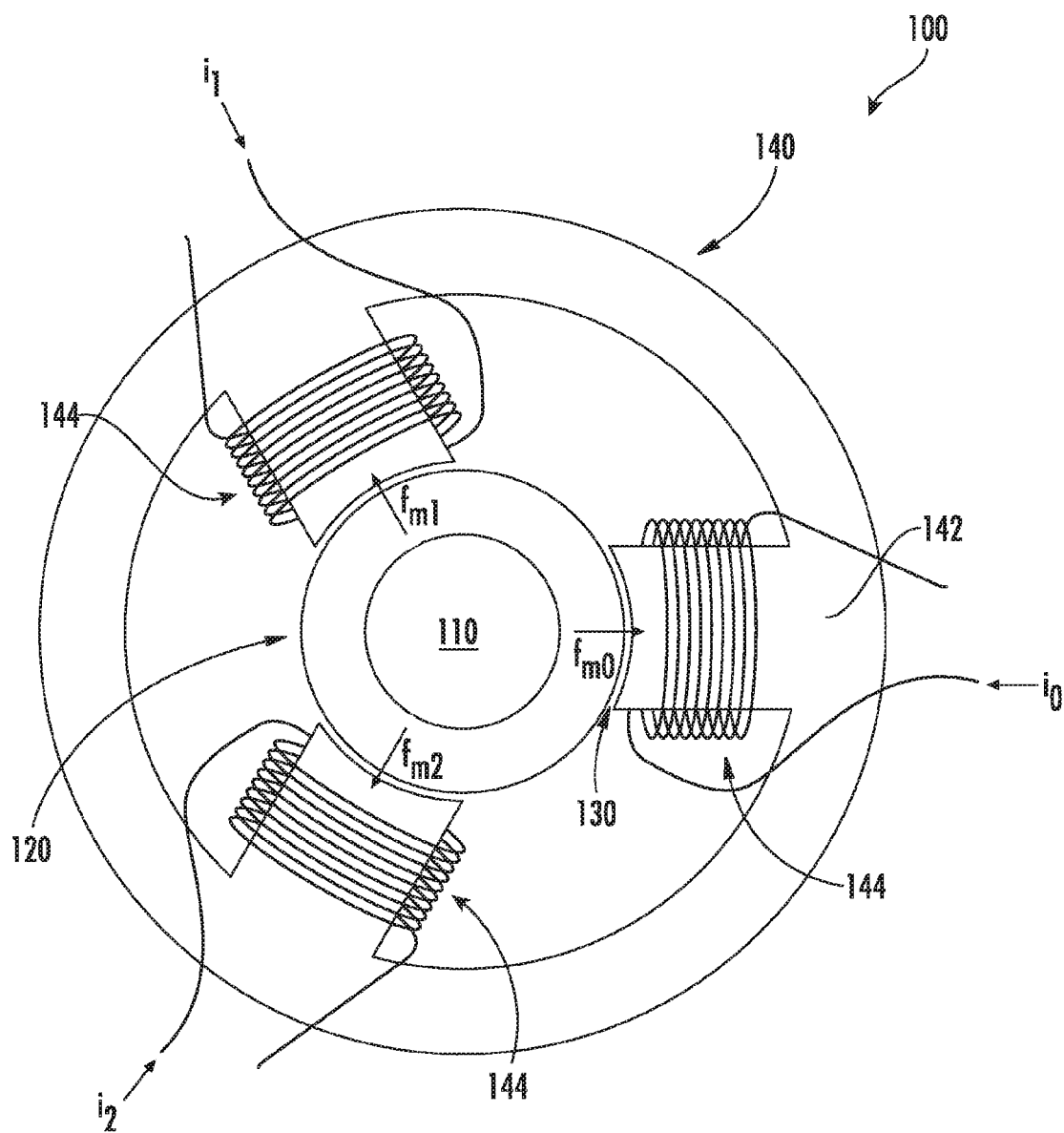
FIG. 3 shows an embodiment of an electromagnetic assembly suitable for use in the radial movement control system of FIG. 1.

FIG. 3 shows an example embodiment of an electromagnet, generally designated 140, which was schematically shown in FIGS. 1 and 2. In the embodiment shown in FIG. 3, the electromagnet 140 comprises three coils 144, which can also be referred to as windings. The coils 144 are held in a substantially stationary, or fixed, position about the bearing 120 and the shaft 110 by a stator 142. The coils 144 are wrapped around radially inwardly extending portions of the stator 142 so that the coils 144 are arranged to have a longitudinal axis thereof be substantially aligned radially with the bearing 120 and/or the shaft 110, such that the longitudinal axis of each coil 144 passes through a center point of the bearing 120 and/or shaft 110 in a non-deflected position. It may be undesirable to induce a magnetic field in the shaft, and therefore a magnetic collar can be fitted to the outside diameter of the shaft, guiding the magnetic flux around the shaft. This collar may be composed of a magnetic permeable material, which may or may not contain multiple permanent magnets.

In this example embodiment, each of the three coils 144 is arranged about the bearing 120 and shaft 110 at 120° intervals so that the three coils 144 are equally spaced around the bearing 120 and the shaft 110. Eccentric, or non-equidistant, arrangements of the coils 144 about the bearing 120 and the shaft 110 are contemplated. When current $i_0$, $i_1$, $i_2$ from, for example, the power amplifier 190 of FIG. 2, is used to energize any of the coils 144 of the electromagnet 140, a magnetic corrective force $f_{m0}$, $f_{m1}$, $f_{m2}$ will be generated by the coil 144 to pull the bearing 120 and the shaft 110 towards the energized coil 144. If the shaft or collar contains permanent magnets, when the direction of the flow of current $i_0$, $i_1$, $i_2$ is reversed from that shown in FIG. 3, the corrective force $f_{m0}$, $f_{m1}$, $f_{m2}$ generated by the coil 144 will be of an opposite direction from the corrective forces $f_{m0}$, $f_{m1}$, $f_{m2}$ shown in FIG. 3, such that, in such instances, the coils 144 are also able to generate a corrective force that pushes the bearing 120 and the shaft 110 away from the energized coil 144. As such, the direction of the corrective force $f_{m0}$, $f_{m1}$, $f_{m2}$ induced by the coil 144 is determined by the direction of the flow of the current $i_0$, $i_1$, $i_2$ through each respective coil 144. Regardless of the embodiment, the direction of the corrective force $f_{m0}$, $f_{m1}$, $f_{m2}$ will be oriented coaxially with a longitudinal direction of the coil 144, shown in FIG. 3 as being wrapped around radially inwardly extending portions of the stator 142.

Figure 4:
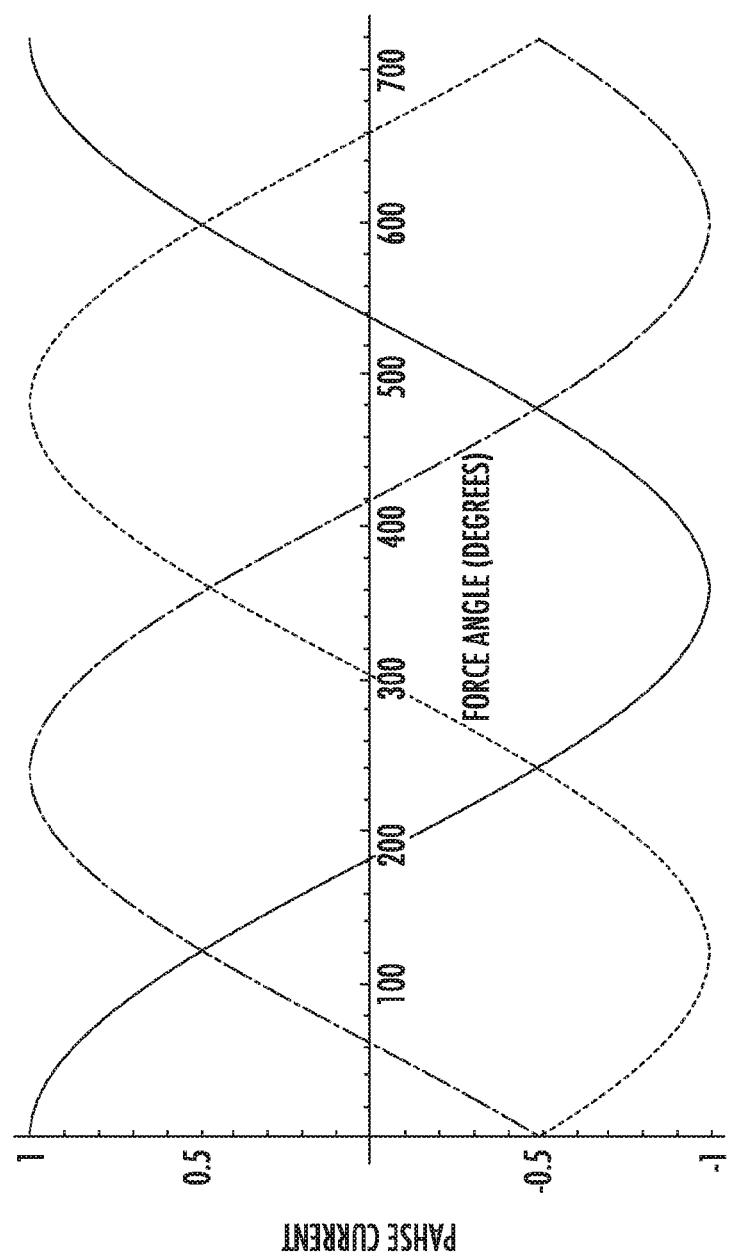
FIG. 4 shows a graph of phase currents vs. force angle compatible suitable for use with the electromagnetic assembly of FIG. 3.

FIG. 4 shows an example current profile whereby current is applied to the three coils 144 of the electromagnet 140 of FIG. 3 with 240 degree phasing. The current plots for the different coils 144 are shown in different line patterns, such that, for example, current $i_0$ is the solid line, current $i_1$ is the dot-dash-dot line, and current $i_2$ is the broken line. The current profile shown will create a forward-rotating radial force at a frequency of 2T, where T is the period of the current waveform. In some embodiments, magnets can be attached to the outer race 124 of the bearing 120 to create push-pull radially-oriented forces. Such discrete magnets on the bearing 120 allow for higher force density.

Figure 5:
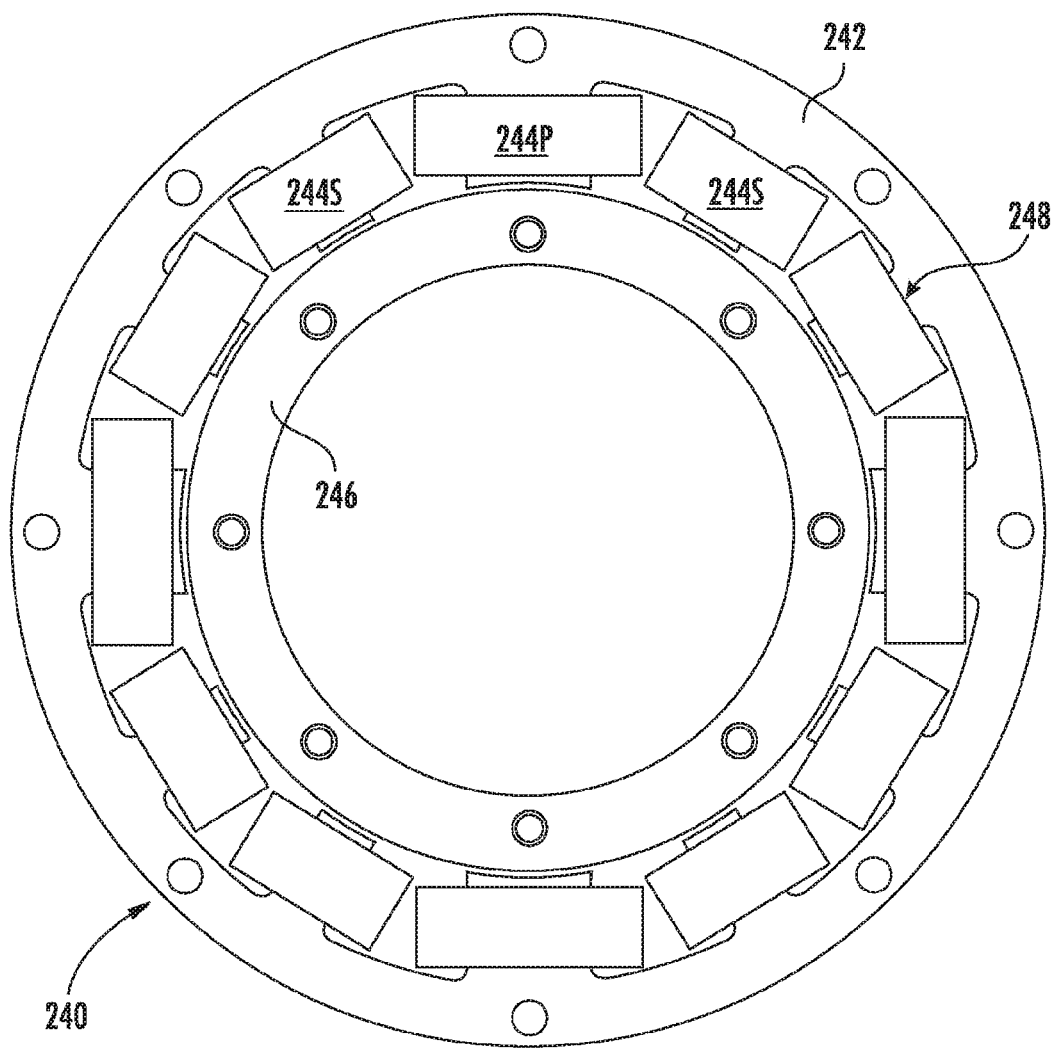
FIG. 5 shows another embodiment of an electromagnetic assembly suitable for use in the radial movement control system of FIG. 1.

FIG. 5 shows a second example embodiment of an electromagnet, generally designated 240, suitable for use in any of the systems, e.g., 100A of FIGS. 1 and 2, disclosed herein. In this embodiment, the electromagnet 240 has four winding sets that are attached to the outer ring 242 and are radially offset from each other at 90 degree intervals around the shaft, which is not shown, but which is arranged radially inwardly of the inner ring 246. Each of the four winding sets comprises three individual coils, a primary coil 244P and two secondary coils 244S, which are arranged on opposite sides of the primary coil 244P in the circumferential direction, such that the primary coil 244P has a first secondary coil 244S on a first side of the primary coil 244P, in a clockwise direction, and a second secondary coil 244S on a second side of the primary coil 244P, in a counterclockwise direction. The primary coil 244P and the secondary coils 244S can also be referred to as primary and secondary poles, respectively.

In this embodiment, by using the primary coil 244P and the secondary coils 244S, rather than a single larger coil, e.g., as is shown in the example embodiment of FIG. 3, the electromagnet 240 of FIG. 5 enables a reduction in the physical size of the electromagnet 240, because by using three coils, primary coil 244P and secondary coils 244S, that have a smaller radial dimension than a single coil that is capable of generating a corrective force of the same magnitude for each coil 144 of the phases shown in the electromagnet 140 of FIG. 3. The outer ring 242 of the actuator is stationary while the inner ring 246 is attached to a part of the rotary machine, such as the outer race of the bearing 120 or the rotatable shaft 110. In some embodiments, the inner ring 246 may have permanent magnets mounted to it, with each magnet being centered on each of the windings 244. In the embodiment shown, each of the primary coils 244P and each of the secondary coils 244S are wrapped around a radially inwardly extending rib, generally designated 248, which is oriented substantially radially with the radial directions of a bearing and/or a shaft. In some embodiments, the electromagnet can have a mixture of types of coils from the example embodiments of FIGS. 3 and 5, such that an electromagnet having winding sets of FIG. 5 and single coils of FIG. 3 are contemplated herein.

Figure 6:
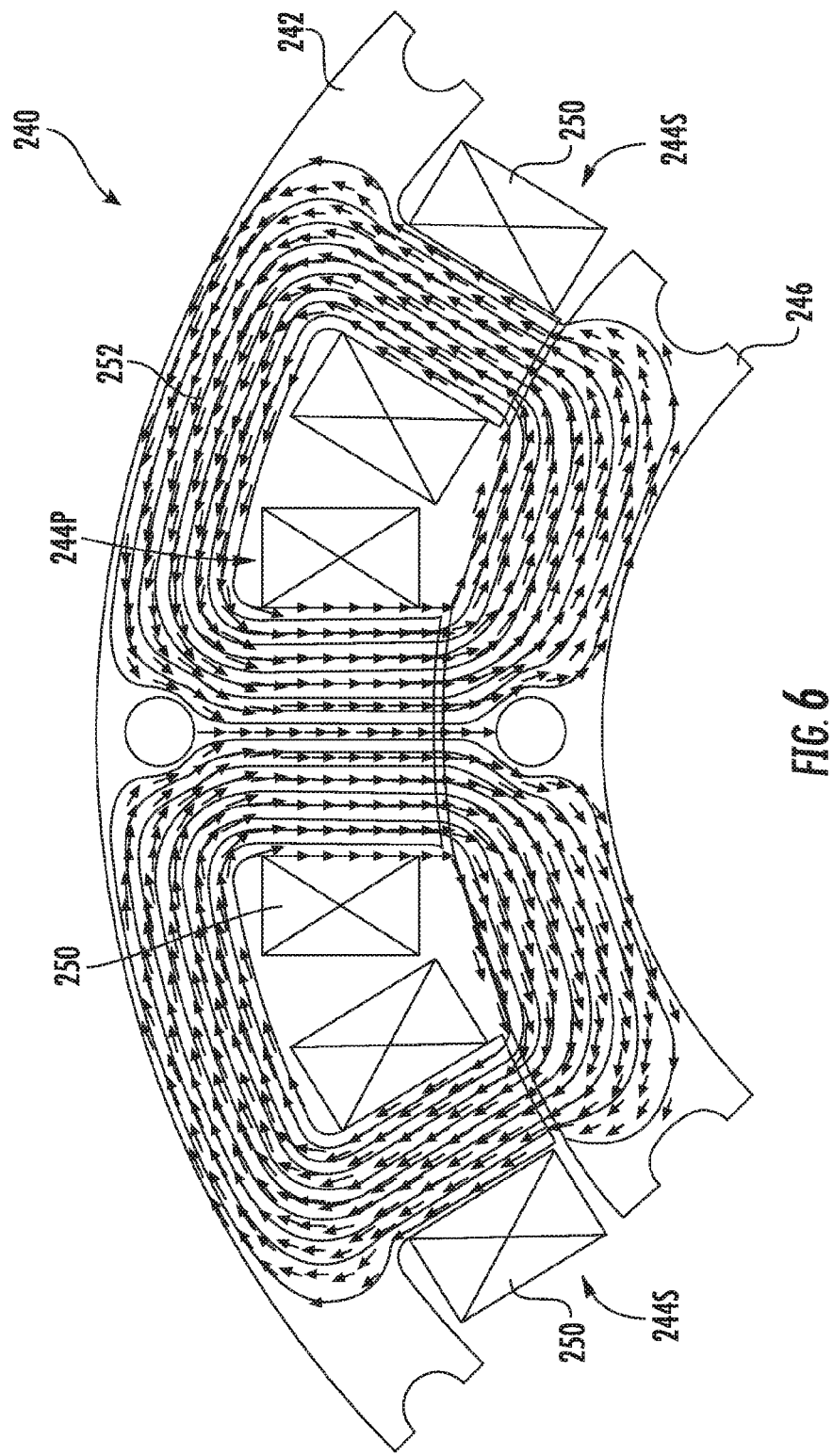
FIG. 6 shows a magnetic flux through a portion of the electromagnetic assembly of FIG. 5.

FIG. 6 shows a quarter of the electromagnet 240 of FIG. 5, including the primary coil 244P of a winding set surrounded by the secondary coils 244S of the same winding set. Magnetic flux 252 is shown flowing between the respective poles 250 of the primary coil 244P and of the secondary coils 244S. In the example shown in FIG. 6, the direction of the current flowing through the primary coil 244P is opposite the direction of the current flowing through each of the secondary coils 244S.

Figure 7:
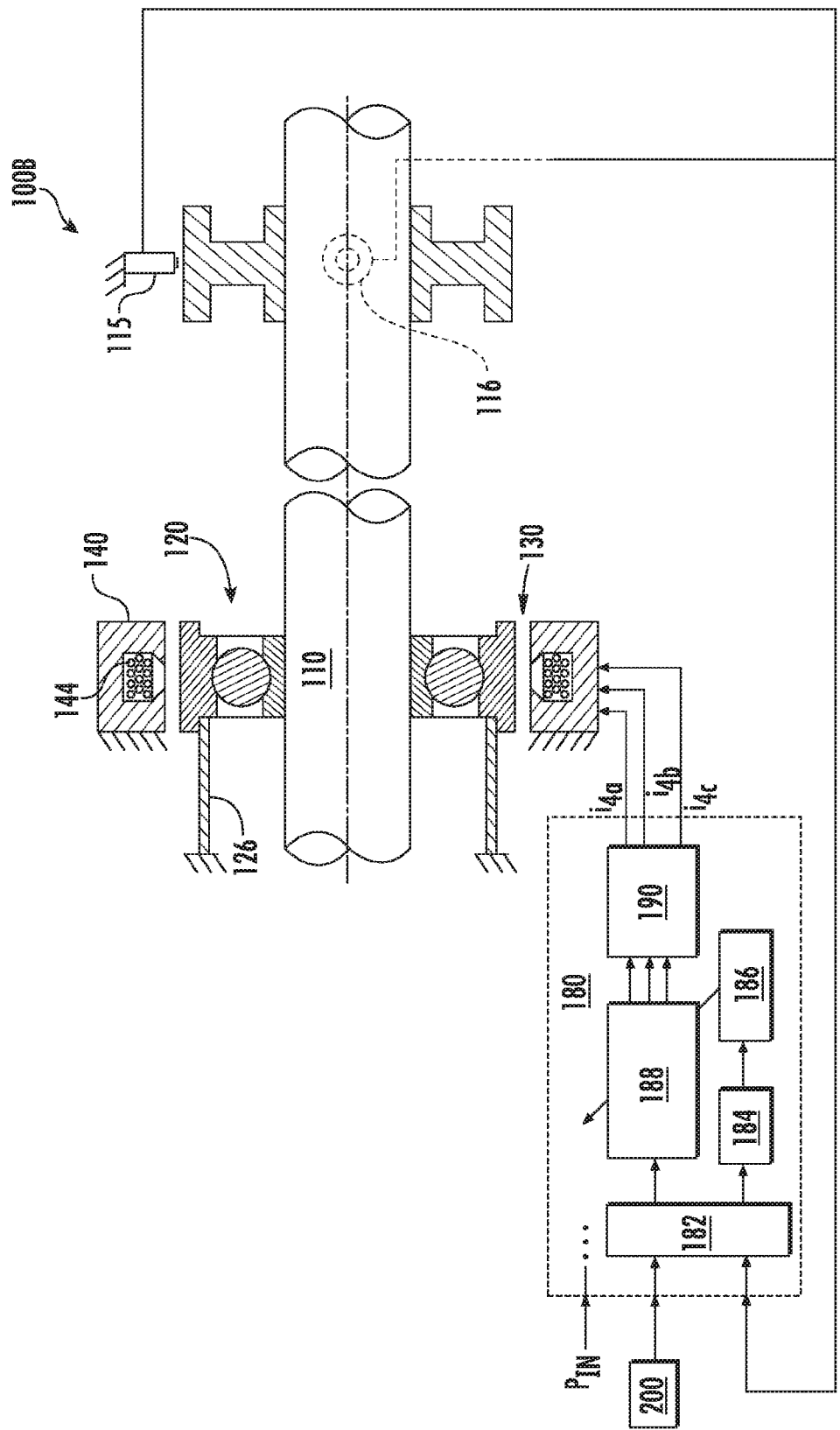
FIG. 7 schematically shows another example embodiment of a radial movement control system.

FIG. 7 shows another example embodiment of a system, generally designated 100B, for controlling the dynamic response of a rotatable shaft 110. The system 100B comprises a rotatable shaft 110 that rotates within a housing, the shaft 110 being supported by a bearing, generally designated 120, which is attached to the housing by a compliant element 126. The bearing 120 has an inner race and an outer race that are separated from each other by a ball bearing, as shown in FIG. 1. The compliant element 126 can be, for example, a spring cage that is connected between the outer race 124 of the bearing 120 and the housing. An electromagnet 140 is attached to the housing, in a position proximal to the outer race 124 of the bearing 120, thereby defining a gap 130 between the electromagnet 140 and the bearing 120.

As shown in FIG. 7, the system 100B includes first and second motion sensors 115, 116, which can arranged about the shaft 110 in the same or different configuration from that shown in system 100A of FIGS. 1 and 2. The controller 180 of the system 100B is configured to receive inputs from the first and second motion sensors 115, 116, as described elsewhere herein regarding the system 100A of FIGS. 1 and 2, from a tachometer 200 corresponding to an angular speed of the shaft 110, and power $P_{IN}$. The input signals from the first and second motion sensors 115, 116 and from the tachometer 200 undergo signal conditioning algorithms at a signal conditioner 182. The controller 180 includes a signal processor 184, such as a multi-tap infinite impulse response (IIR) or finite impulse response (FIR) filtering, demodulation, Fast Fourier Transform (FFT), or a Discrete Fourier Transform (DFT), to extract relevant corresponding frequency components from the input signals from the tachometer 200 and the first and second motion sensors 115, 116. An adaptation module 186 applies adaptation methods, such as Filtered-X LMS, receiving the processed sensor signals from the signal processor 184 and adaptively modifies the magnitude and phase of the current signals provided to the electromagnet 140, such that values measured by the first and second motion sensors 115, 116 evolve toward desired values. The current signals are then received by the waveform generator 188 and a force command, which can include the computed parameters, is sent to a power amplifier 190. The power amplifier 190 receives, for each phase of the electromagnet 140, a force command, which can include the computed parameters.

The controller 180 then computes parameters associated with the corrective force(s) required to counteract the detected/derived rotary imbalance of the shaft 110 based on the inputs from the tachometer 200 and/or the first and second motion sensors 115, 116. The parameters computed can include one or more of a magnitude, a phase, a frequency, and a direction of the corrective force required to negate or counteract, at least partially, the imbalanced motions of the shaft 110. The controller 180 then sends a force command, which can include the computed parameters, to a power amplifier 190. The power amplifier 190 sends a current $i_{4a}$, $i_{4b}$, $i_{4c}$ corresponding to the amplified corrective force to each phase of the electromagnet 140.

Figure 8:
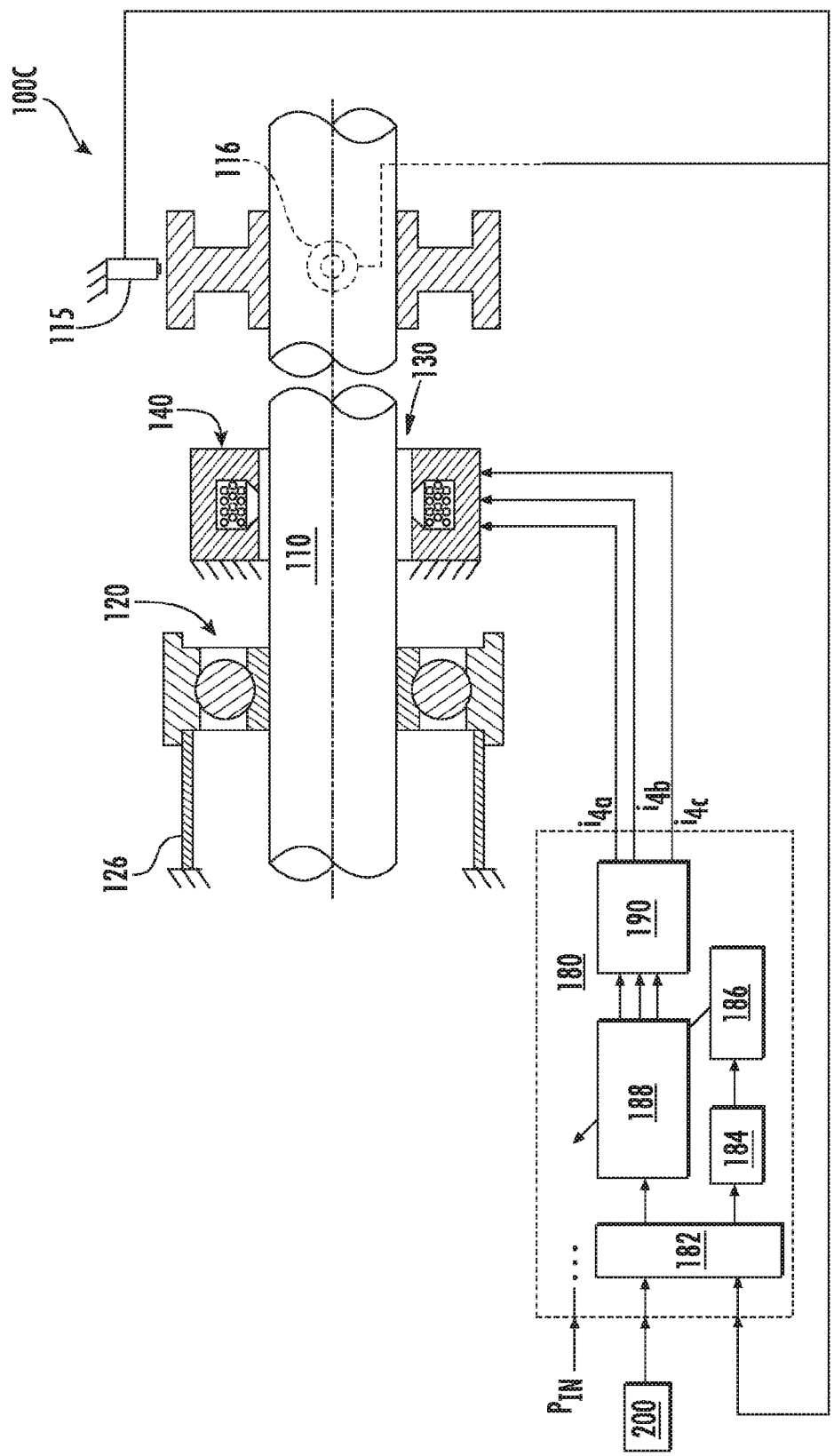
FIG. 8 schematically shows another example embodiment of a radial movement control system.
Figure 9:
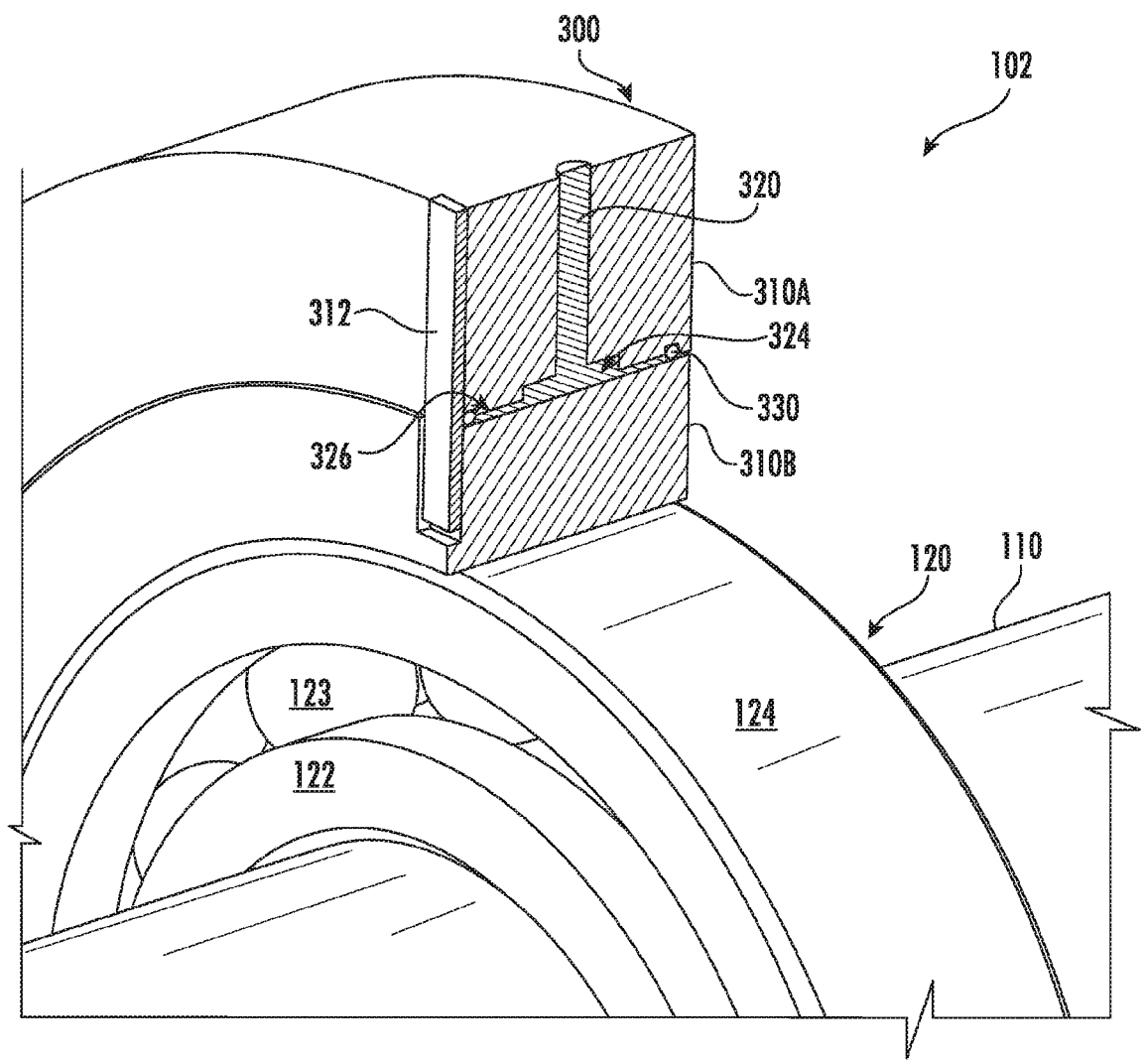
FIG. 9 is a partial sectional view of a squeeze film damper for use in any embodiments of the radial movement control systems disclosed herein.

FIG. 8 shows still another example embodiment of a system, generally designated 100C, for controlling the dynamic response of a rotatable shaft 110. The system 100C comprises a rotatable shaft 110 that rotates within a housing, the shaft 110 being supported by a bearing, generally designated 120, which is attached to the housing by a compliant element 126. The bearing 120 has an inner race and an outer race that are separated from each other by a ball bearing, as shown in FIG. 1. The compliant element 126 can be, for example, a spring cage that is connected between the outer race of the bearing 120 and the housing. An electromagnet, generally designated 140, is attached to the housing, in a position proximal to the shaft, thereby defining a gap, generally designated 130, between the electromagnet 140 and the shaft 110. In this embodiment, the electromagnet 140 and the bearing 120 are spaced apart from each other in the longitudinal, or axial, direction of the shaft 110, such that the electromagnet 140 and the bearing 120 are not coplanar with each other, unlike in the embodiments shown in FIGS. 1, 2, and 7.

As shown in FIG. 7, the system 100B includes first and second motion sensors 115, 116, which can arranged about the shaft 110 in the same or different configuration from that shown in system 100A of FIGS. 1 and 2. The controller 180 of the system 100B is configured to receive inputs from the first and second motion sensors 115, 116, as described elsewhere herein regarding the system 100A of FIGS. 1 and 2, from a tachometer 200 corresponding to an angular speed of the shaft 110, and power $P_{IN}$. The input signals from the first and second motion sensors 115, 116 and from the tachometer 200 undergo signal conditioning algorithms at a signal conditioner 182. The controller 180 includes a signal processor 184, such as a multi-tap infinite impulse response (IIR) or finite impulse response (FIR) filtering, demodulation, Fast Fourier Transform (FFT), or a Discrete Fourier Transform (DFT), to extract relevant corresponding frequency components from the input signals from the tachometer 200 and the first and second motion sensors 115, 116. An adaptation module 186 applies adaptation methods, such as Filtered-X LMS, receiving the processed sensor signals from the signal processor 184 and adaptively modifies the magnitude and phase of the current signals provided to the electromagnet 140, such that values measured by the first and second motion sensors 115, 116 evolve toward desired values. The current signals are then received by the waveform generator 188 and a force command, which can include the computed parameters, is sent to a power amplifier 190. The power amplifier 190 receives, for each phase of the electromagnet 140, a force command, which can include the computed parameters.

The controller 180 then computes parameters associated with the corrective force(s) required to counteract the detected/derived rotary imbalance of the shaft 110 based on the inputs from the tachometer 200 and/or the first and second motion sensors 115, 116. The parameters computed can include one or more of a magnitude, a phase, a frequency, and a direction of the corrective force required to negate or counteract, at least partially, the imbalanced motions of the shaft 110. The controller 180 then sends a force command, which can include the computed parameters, to a power amplifier 190. The power amplifier 190 sends a current $i_{4a}$, $i_{4b}$, $i_{4c}$ corresponding to the amplified corrective force to each phase of the electromagnet 140.

As noted hereinabove, in embodiments having at least three phases 144 for the electromagnet 140, current $i_{4a}$, $i_{4b}$, $i_{4c}$ is sent to each of the phases of the electromagnet 140 according to a control current profile, e.g., as shown in FIG. 3, from the controller 180, which receives power $P_{IN}$ from a remote source. A tachometer 200 provides a signal to the controller 180 that is synchronous with a multiple of the rotating speed of the shaft, e.g., $N*\omega$, where $\omega$ is the rotating speed of the shaft and $N=\frac{1}{3}$, $\frac{1}{2}$, 1, 2, 3, etc. The tachometer input passes through a signal conditioner 182 and then into a waveform generator 188 that outputs a number of periodic waveforms corresponding to the number of phases of the electromagnet 140. These periodic waveforms are then amplified by a power amplifier 190 and sent as current signals $i_{4a}$, $i_{4b}$, $i_{4c}$ to the different phases 144 of the electromagnet 140. As noted above, FIG. 4 shows an example of representative periodic waveform signals for the current signals $i_{4a}$, $i_{4b}$, $i_{4c}$.

Applying the current signals $i_{4a}$, $i_{4b}$, $i_{4c}$ to the electromagnet 140 induces a corrective force, acting on the rotatable shaft 110 at a position proximal to the electromagnet 140, to counteract imbalanced movements and/or vibrations of the shaft 110. As a result of the periodic nature of these current signals $i_{4a}$, $i_{4b}$, $i_{4c}$, the corrective forces generated by each phase 144 of the electromagnet 140 will rotate synchronously at the angular speed of the shaft 110, or a ratio or multiple thereof, in the direction of the shaft rotation, in the opposite direction of the shaft rotation, or any suitable combination(s) thereof. Combining such forward and backward rotating force vectors allows the system 100C to provide asymmetric corrective forces between the vertical and horizontal directions. In some embodiments, linear control forces may be used to control the motion of the rotatable shaft 110.

In general, the resultant corrective forces will be characterized by a magnitude and a phase, where the phase is measured with respect to the input received from the tachometer 200. In some advantageous embodiments, multiple superimposed periodic currents at multiple frequencies are applied to the electromagnet 140, thereby producing multiple corrective forces, each of which is characterized by a magnitude and a phase, which can be the same or different from other corrective forces.

Such motion control systems are advantageously used in a variety of applications. As discussed elsewhere hereinabove, such systems may be implemented to use adaptive control laws to minimize control sensor signals. Such systems may vary sensor and actuator weighting at different operation stages to achieve desired results.

In some embodiments, damping forces are advantageous in further reducing the vibration of the rotor system while traversing the critical speeds and during normal operation. Damping forces can be applied passively, through electromagnetic corrective forces that oppose the radial velocity of the rotary components of the system, or in any suitable combinations thereof.

In some embodiments, passive damping can be incorporated into the gap between the electromagnet 140 and the bearing 120 or shaft 110, see, e.g., FIGS. 1, 2, 7, and 8. For example, a fluid squeeze film or an elastomer may be arranged within the gap 130 to provide such passive damping. In such embodiments, the added damping will act to enhance vibration reduction while traversing the critical speeds and/or during normal operation.

Supplemental damping provides further advantages of providing enhanced safety in a failure scenario, such as during, for example, a failure of the electromagnet, the controller, the power input, the tachometer, and/or the sensors. In such failure scenarios, an acceptable level of damping may be provided by the passive damping features to avoid damage to the rotary components themselves while traversing the critical speed(s) during operation of the system until corrective actions, such as repairs, can be undertaken. Passive damping features may include but are not limited to, viscous fluid disposed between the bearing and housing, viscous fluid disposed in the airgap of the actuator, redundant windings, and the connection of all coil terminals together such that the device acts like a damper. Such failure modes where sufficient damping is added to the system to avoid damage to the rotary components is referred to as "failsafe". In such scenarios, the system may not be capable of operating within desired levels of noise and vibration for normal use of such a system.

In some other embodiments, vibration reduction sensors may be used, along with other remote sensors, to inhibit excess motion of the rotary components, for example, the shaft, 110, see, e.g., FIGS. 1, 2, 7, and 8. In embodiments where the vibration reduction system is implemented in a moving structure, for example, an aircraft, automobile, etc., remote sensors may be provided to detect the motions experienced by the entire moving structure. When such maneuvers are detected, for example, via accelerometer feedback, the electromagnet may be configured to generate a force vector that behaves like a positive stiffness to inhibit excessive motion of the shaft and any components rotatably connected thereto, in the direction opposite that of the maneuver detected. For example, if an aircraft were detected to be undertaking a maneuver that causes a force in the downward, or negative vertical, direction, such as occurs when the aircraft increases its rate of ascent, the electromagnet may be configured to generate a force in the upward, or positive vertical, direction to resist this deflection of the shaft and other rotary components that would otherwise be caused by maneuvers of the aircraft. The corrective vertical force in the example described hereinabove can be terminated when the sensors detect that the aircraft has completed the maneuver. In some embodiments, the system may only be configured to react to maneuvers that are of a significant magnitude of "g" forces.

Figure 10A:
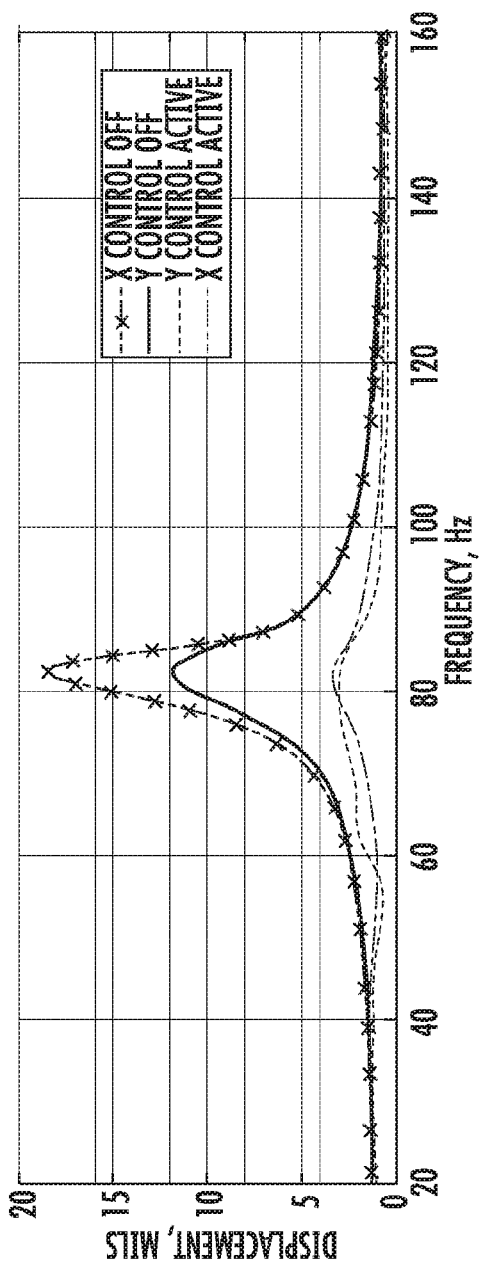
FIGS. 10A and 10B are graphical plots of mid-span displacement magnitude and phase response v. frequency, respectively, with and without active control enabled.
Figure 10B:
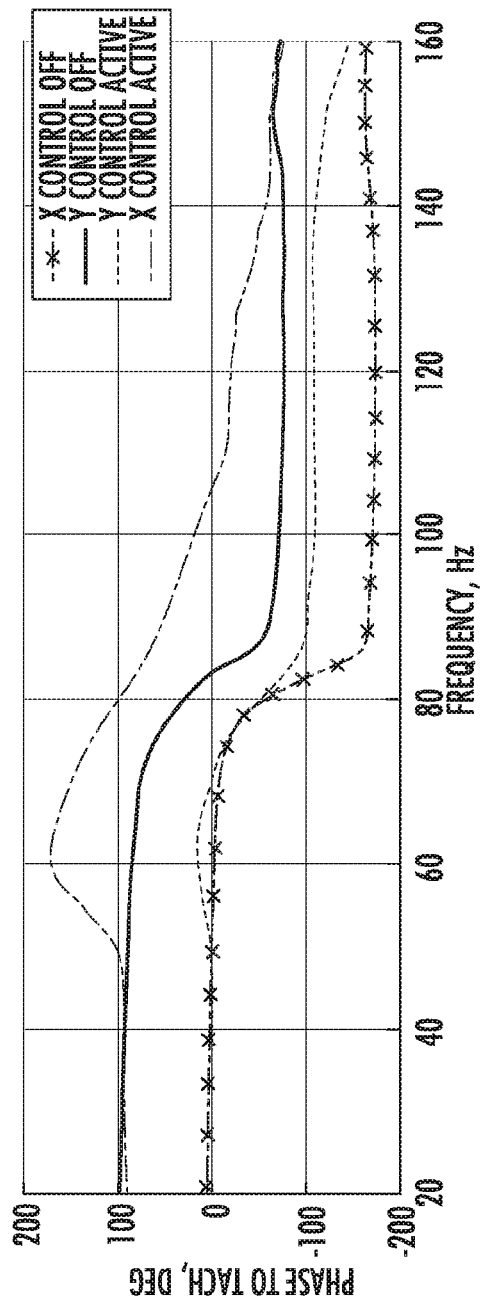

FIGS. 10A and 10B show mid-span shaft deflection and phase to tachometer of a high-speed test with a long, slender shaft rotatably mounted to a test stand. The test stand had an electromagnet similar to electromagnet 240 shown in FIG. 5 mounted to a first bearing support, with the inner ring (e.g., 246, FIG. 5) rigidly attached to the outer race of the bearing, such that the inner ring and the outer race of the bearing translate radially together, the electromagnet being axially offset from the bearing in the direction of the longitudinal axis of the shaft. The shaft was supported at another position along its length by a second bearing support, which was rigidly mounted to the test stand base. FIG. 10A shows mid-span deflection of the shaft in the X- and Y-directions, both with the control on (e.g., with the electromagnet enabled and generating a corrective radial force) and off (e.g., with the electromagnet disabled). With the control on, the mid-span shaft deflection at the critical speed is shown to be reduced by about 80% and, furthermore, mid-span shaft deflection between 55 Hz to 160 Hz, inclusive, is reduced by about 50%.

FIGS. 11-19 show further example embodiments of vibration control systems according to the subject matter disclosed herein. Since like reference numbers refer to like structures herein, the foregoing descriptions may omit detailed descriptions of features and/or structures that are already described hereinabove in one of the embodiments for the vibration control systems 100A, 100B, and 100C.

Figure 11:
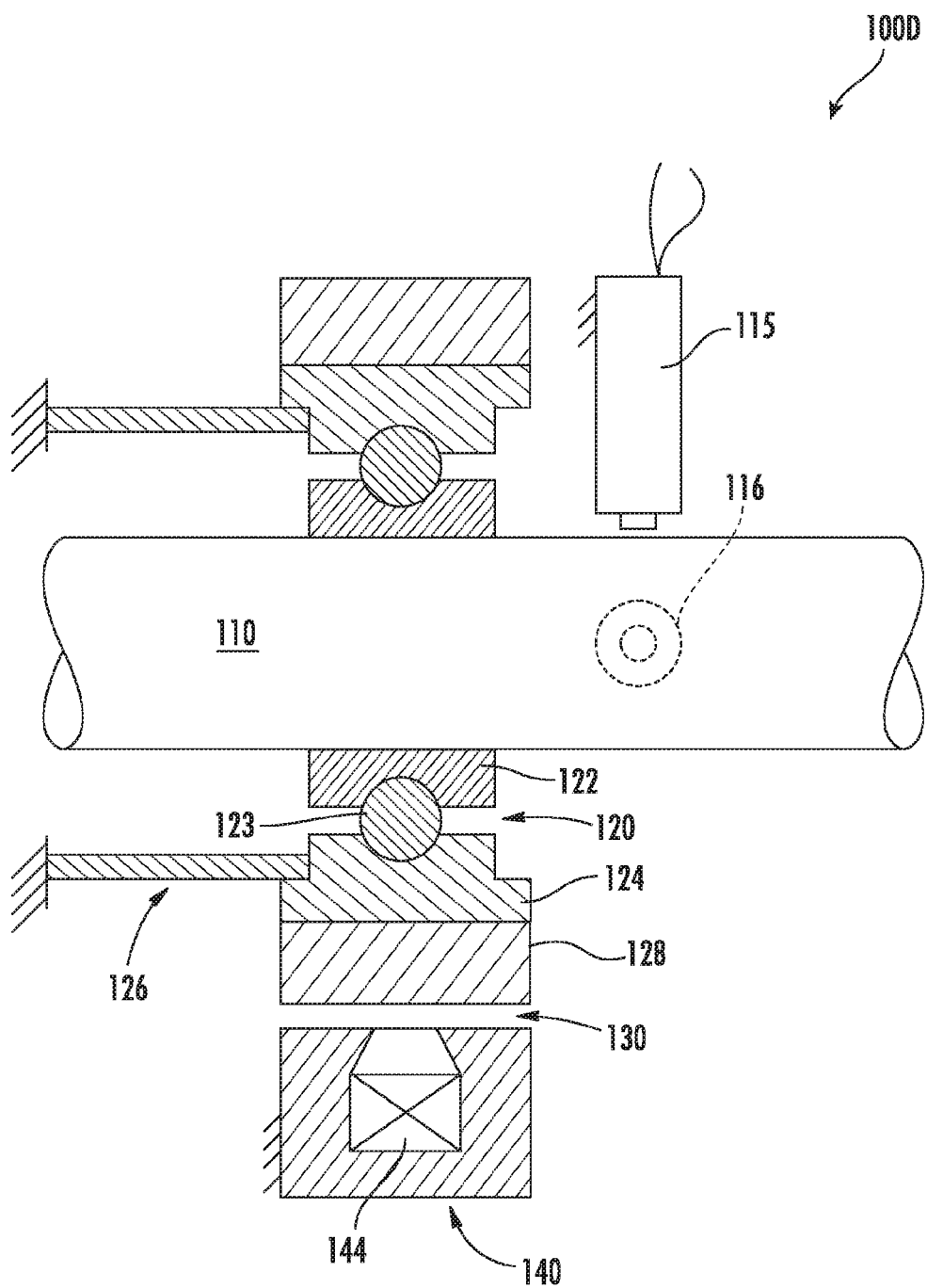
FIG. 11 schematically shows another example embodiment of a radial movement control system.

FIG. 11 shows a portion of another example embodiment of a vibration control system, generally designated 100D, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100D, in order to avoid magnetizing the bearing 120 and/or to allow for the bearing 120 to be made from a material that is not magnetically reactive, the outer race 124 of the bearing 120 is surrounded, either continuously or with discrete portions spaced circumferentially about the outer race 124, by a magnetically responsive collar 128, which prevents the magnetic flux from the electromagnet 140 from magnetizing the bearing 120. In some embodiments, the collar 128 may contain permanent magnets aligned with the magnetic field generated by the electromagnet 140, which allow the electromagnet 140 to generate both attractive and repulsive corrective forces on the collar 128. An attractive corrective force is defined herein as a force that pulls the collar 128 radially towards the energized phase(s) 144 of the electromagnet 140 generating the attractive corrective force(s). A repulsive corrective force is defined herein as a force that pushes the collar 128 radially away from the energized phase(s) 144 of the electromagnet 140 generating the repulsive corrective force(s). In the embodiment shown, the electromagnet 140 surrounds the collar 128 and is spaced apart from the collar 128 by a gap, generally designated 130, so as to exert radially-oriented magnetic corrective forces, for example, $f_{m0}$, $f_{m1}$, $f_{m2}$ in FIG. 3, on the collar 128 and, hence, the shaft 110 and bearing 120, to which the collar 128 is attached.

The magnetically reactive collar 128 acts as a part of the magnetic circuit used to generate the corrective forces to counteract the vibration and/or radial displacements of the shaft 110 during operation of the rotary machine. The electromagnet 140 has a plurality of phases 144, or coils, such that sequencing current to each of the plurality of phases 144 can result in a rotating radially-oriented corrective force. In some embodiments, the electromagnet 140 has three or more phases. In some other embodiments, the electromagnet 144 has four phases.

Figure 12:
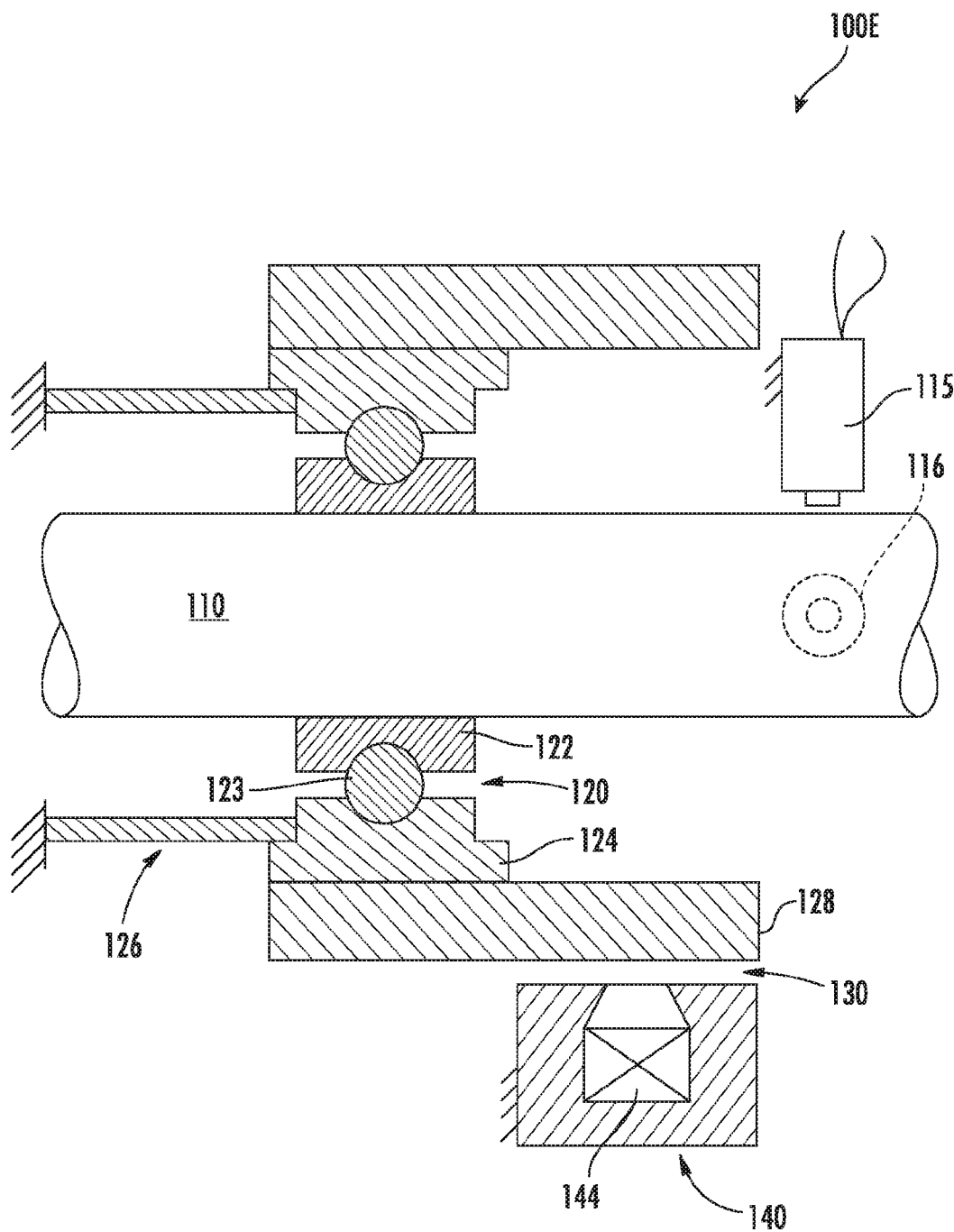
FIG. 12 schematically shows another example embodiment of a radial movement control system.

FIG. 12 shows a portion of another example embodiment of a vibration control system, generally designated 100E, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100D, in order to avoid magnetizing the bearing 120 and/or to allow for the bearing 120 to be made from a material that is not magnetically reactive, the outer race 124 of the bearing 120 is surrounded, either continuously or with discrete portions spaced circumferentially about the outer race 124, by a magnetically responsive collar 128, which prevents the magnetic flux from the electromagnet 140 from magnetizing the bearing 120. In the example embodiment shown in FIG. 12, the collar 128 has a portion that is rigidly attached to the outer race 124 of the bearing 120 and a portion that extends away from the bearing 120 in the direction substantially coaxial with the longitudinal direction of the shaft 110. In some embodiments, the portion of the collar 128 that extends away from the bearing 120 may contain permanent magnets aligned with the magnetic field generated by the electromagnet 140, which allow the electromagnet 140 to generate both attractive and repulsive corrective forces on the collar 128. An attractive corrective force is defined herein as a force that pulls the collar 128 radially towards the energized phase(s) 144 of the electromagnet 140 generating the attractive corrective force(s). A repulsive corrective force is defined herein as a force that pushes the collar 128 radially away from the energized phase(s) 144 of the electromagnet 140 generating the repulsive corrective force(s). In the embodiment shown, the electromagnet 140 surrounds the collar 128 and is spaced apart from the collar 128 by a gap, generally designated 130, so as to exert radially-oriented magnetic corrective forces, for example, $f_{m0}$, $f_{m1}$, $f_{m2}$ in FIG. 3, on the collar 128 and, hence, the shaft 110 and bearing 120, to which the collar 128 is attached. Unlike in embodiments wherein the electromagnet 140 is coplanar with the bearing 120, as shown, for example, in system 100D in FIG. 11, the axial displacement of the electromagnet 140 from the bearing 120, such that the electromagnet 140 and the bearing 120 are not coplanar to each other, yields corrective forces generated by the electromagnet 140 that are also not axially aligned with the center of the bearing 120. Such axially non-aligned corrective forces result in a coupled radial force and moment exerted on the bearing 120 when the electromagnet 140 exerts a corrective force on the collar 128.

The magnetically reactive collar 128 acts as a part of the magnetic circuit used to generate the corrective forces to counteract the vibration and/or radial displacements of the shaft 110 during operation of the rotary machine. The electromagnet 140 has a plurality of phases 144, or coils, such that sequencing current to each of the plurality of phases 144 can result in a rotating radially-oriented corrective force. In some embodiments, the electromagnet 140 has three or more phases. In some other embodiments, the electromagnet 144 has four phases.

Figure 13:
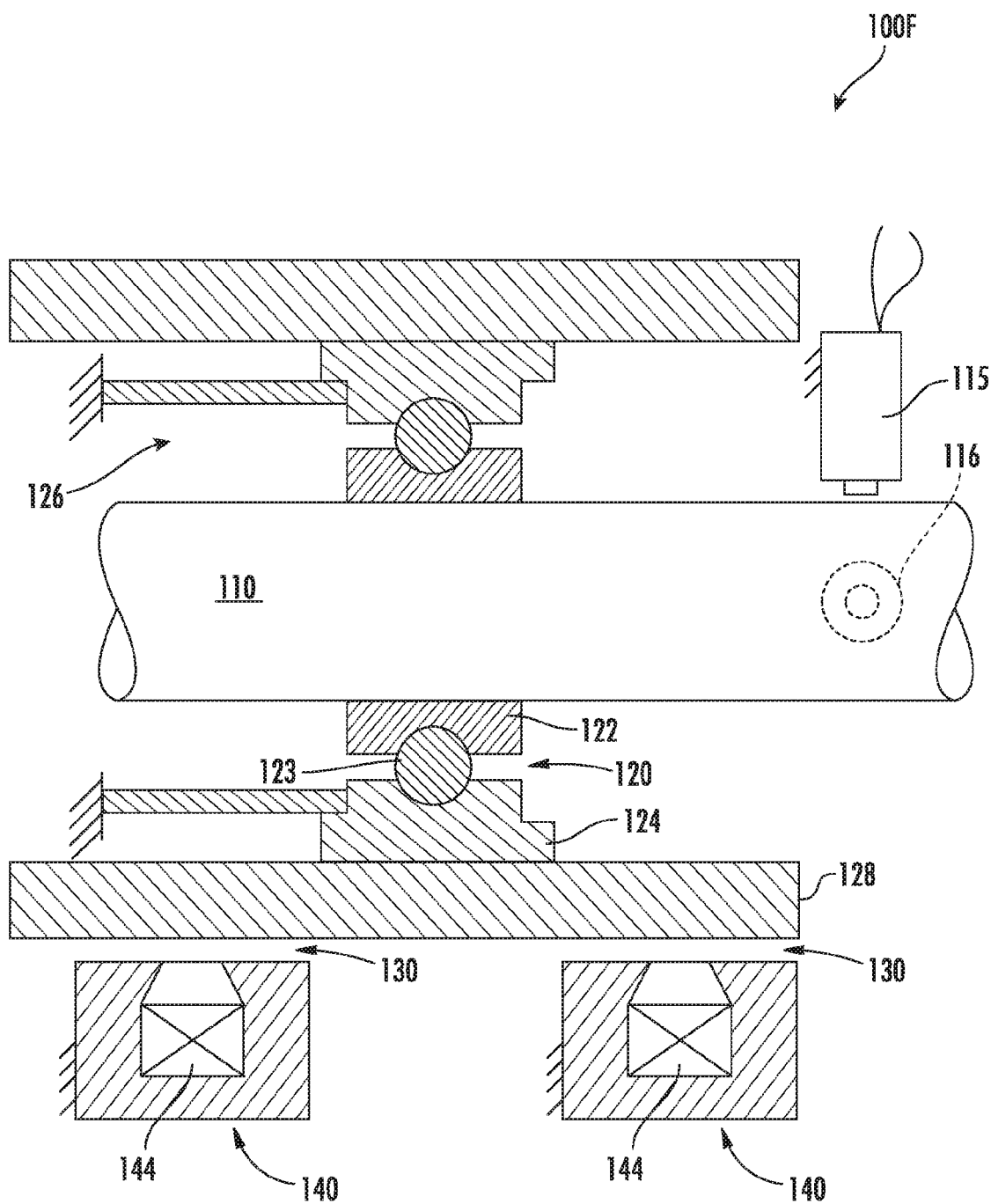
FIG. 13 schematically shows another example embodiment of a radial movement control system.

FIG. 13 shows a portion of another example embodiment of a vibration control system, generally designated 100F, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100F, in order to avoid magnetizing the bearing 120 and/or to allow for the bearing 120 to be made from a material that is not magnetically reactive, the outer race 124 of the bearing 120 is surrounded, either continuously or with discrete portions spaced circumferentially about the outer race 124, by a magnetically responsive collar 128, which prevents the magnetic flux from the electromagnet 140 from magnetizing the bearing 120. In the example embodiment shown in FIG. 12, the collar 128 has a portion that is rigidly attached to the outer race 124 of the bearing 120 and portions that extend away from the bearing 120 in opposite directions that are substantially coaxial with the longitudinal direction of the shaft 110. As such, the collar 128 has a first portion at which the collar 128 is rigidly attached to the outer race 124 of the bearing 120, a second portion that extends in a first direction along the axial direction of the shaft 110, and a third portion that extends in a second direction along the axial direction of the shaft 110, the first direction being oriented substantially 180° (e.g., from 170° to 190°, inclusive) from the second direction. In such embodiments, it may be advantageous to use two electromagnets 140, each of which is arranged over one of the second or third portions of the collar 128 to generate corrective forces that act on the respective second or third portions of the collar 128. In such embodiments, the electromagnets 140 may act in concert to generate a moment about the bearing, a radial force acting on or about the center of the bearing, or any combination thereof. For example, by using two electromagnets 140 spaced apart from (e.g., not coplanar with) the bearing along the direction of the longitudinal axis of the shaft 110, it is possible for the bearing 120 to be independently moved in the radial direction and/or twisted about the center of the bearing 120 and/or shaft 110.

In some embodiments, the second and/or third portions of the collar 128 may contain permanent magnets aligned with the magnetic field generated by the electromagnet 140, which allow the electromagnet 140 to generate both attractive and repulsive corrective forces on the collar 128. An attractive corrective force is defined herein as a force that pulls the collar 128 radially towards the energized phase(s) 144 of the electromagnet 140 generating the attractive corrective force(s). A repulsive corrective force is defined herein as a force that pushes the collar 128 radially away from the energized phase(s) 144 of the electromagnet 140 generating the repulsive corrective force(s). In the embodiment shown, the electromagnet 140 surrounds the collar 128 and is spaced apart from the collar 128 by a gap, generally designated 130, so as to exert radially-oriented magnetic corrective forces, for example, $f_{m0}$, $f_{m1}$, $f_{m2}$ in FIG. 3, on the collar 128 and, hence, the shaft 110 and bearing 120, to which the collar 128 is attached. Unlike in embodiments wherein the electromagnet 140 is coplanar with the bearing 120, as shown, for example, in system 100D in FIG. 11, the axial displacement of the electromagnet 140 from the bearing 120, such that the electromagnet 140 and the bearing 120 are not coplanar to each other, yields corrective forces generated by the electromagnet 140 that are also not axially aligned with the center of the bearing 120. Such axially non-aligned corrective forces result in a coupled radial force and moment exerted on the bearing 120 when the electromagnet 140 exerts a corrective force on the collar 128.

The magnetically reactive collar 128 acts as a part of the magnetic circuit used to generate the corrective forces to counteract the vibration and/or radial displacements of the shaft 110 during operation of the rotary machine. The electromagnet 140 has a plurality of phases 144, or coils, such that sequencing current to each of the plurality of phases 144 can result in a rotating radially-oriented corrective force. In some embodiments, the electromagnet 140 has three or more phases. In some other embodiments, the electromagnet 144 has four phases.

Figure 14:
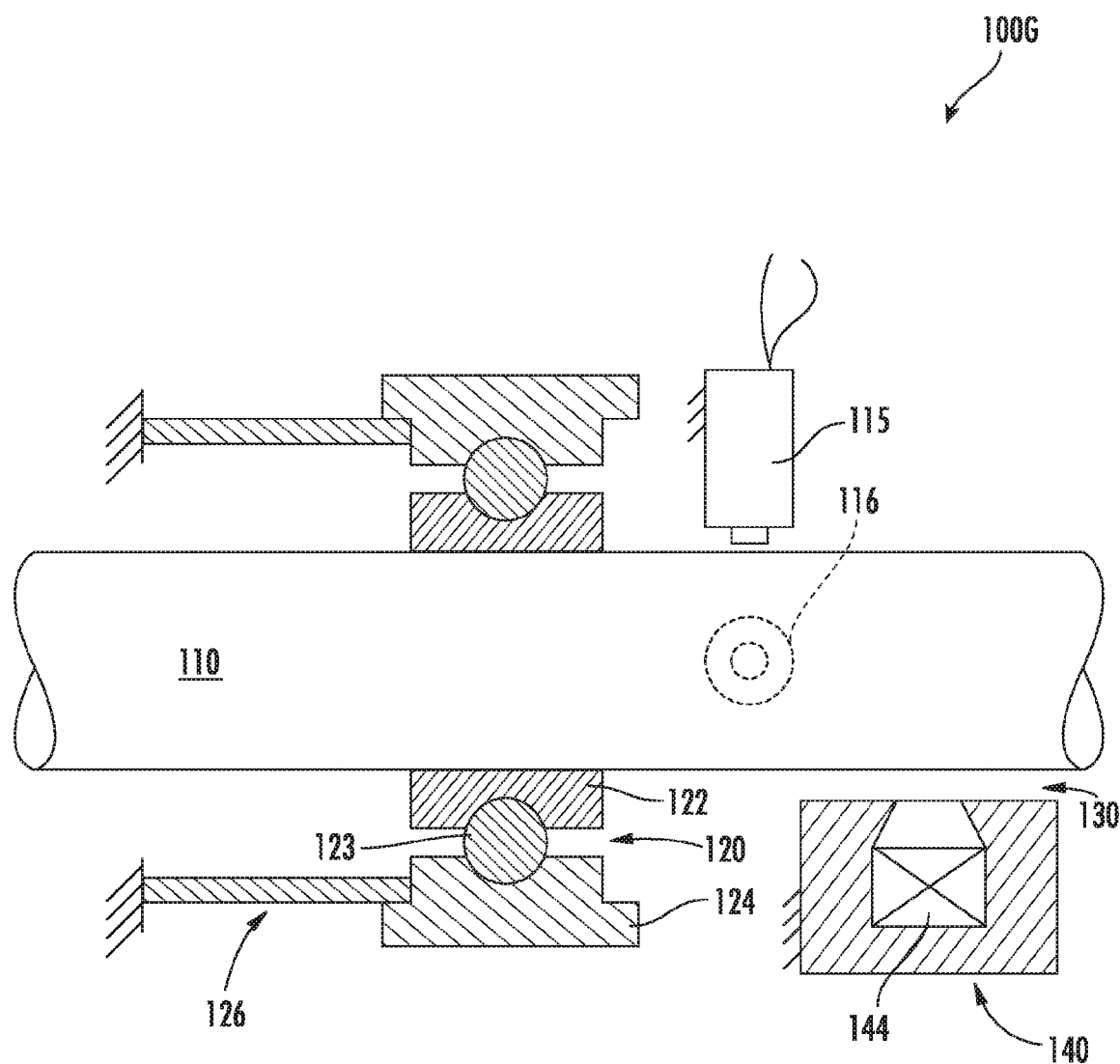
FIG. 14 schematically shows another example embodiment of a radial movement control system.

FIG. 14 shows a portion of another example embodiment of a vibration control system, generally designated 100G, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100G, in order to avoid magnetizing the bearing 120 and/or to apply a corrective force to the shaft 100 that is not aligned with (e.g., is axially offset from the bearing 120 in the direction of the longitudinal axis of the shaft 110) the shaft 110, the electromagnet 140 is arranged about and adjacent to the outer circumference of the shaft 110, being spaced apart from the shaft 110 by a gap, generally designated 130. This arrangement allows the electromagnet 140 to exert a corrective force on the shaft 110 directly. In this example embodiment, the shaft 110 is made from a magnetically responsive material, such that the magnetic field generated by the electromagnet 140 will be able to exert a corresponding corrective force on the shaft 110. In some embodiments, the shaft 110 may contain permanent magnets aligned with the magnetic field generated by the electromagnet 140, which allow the electromagnet 140 to generate both attractive and repulsive corrective forces on the shaft 110. An attractive corrective force is defined herein as a force that pulls the shaft 110 radially towards the energized phase(s) 144 of the electromagnet 140 generating the attractive corrective force(s). A repulsive corrective force is defined herein as a force that pushes the shaft 110 radially away from the energized phase(s) 144 of the electromagnet 140 generating the repulsive corrective force(s). In the embodiment shown, the electromagnet 140 surrounds the shaft 110 and is spaced apart from the collar 128 by a gap, generally designated 130, so as to exert radially-oriented magnetic corrective forces, for example, $f_{m0}$, $f_{m1}$, $f_{m2}$ in FIG. 3, on the shaft 110 directly, rather than via an intermediate structure, such as the bearing 120.

Figure 15:
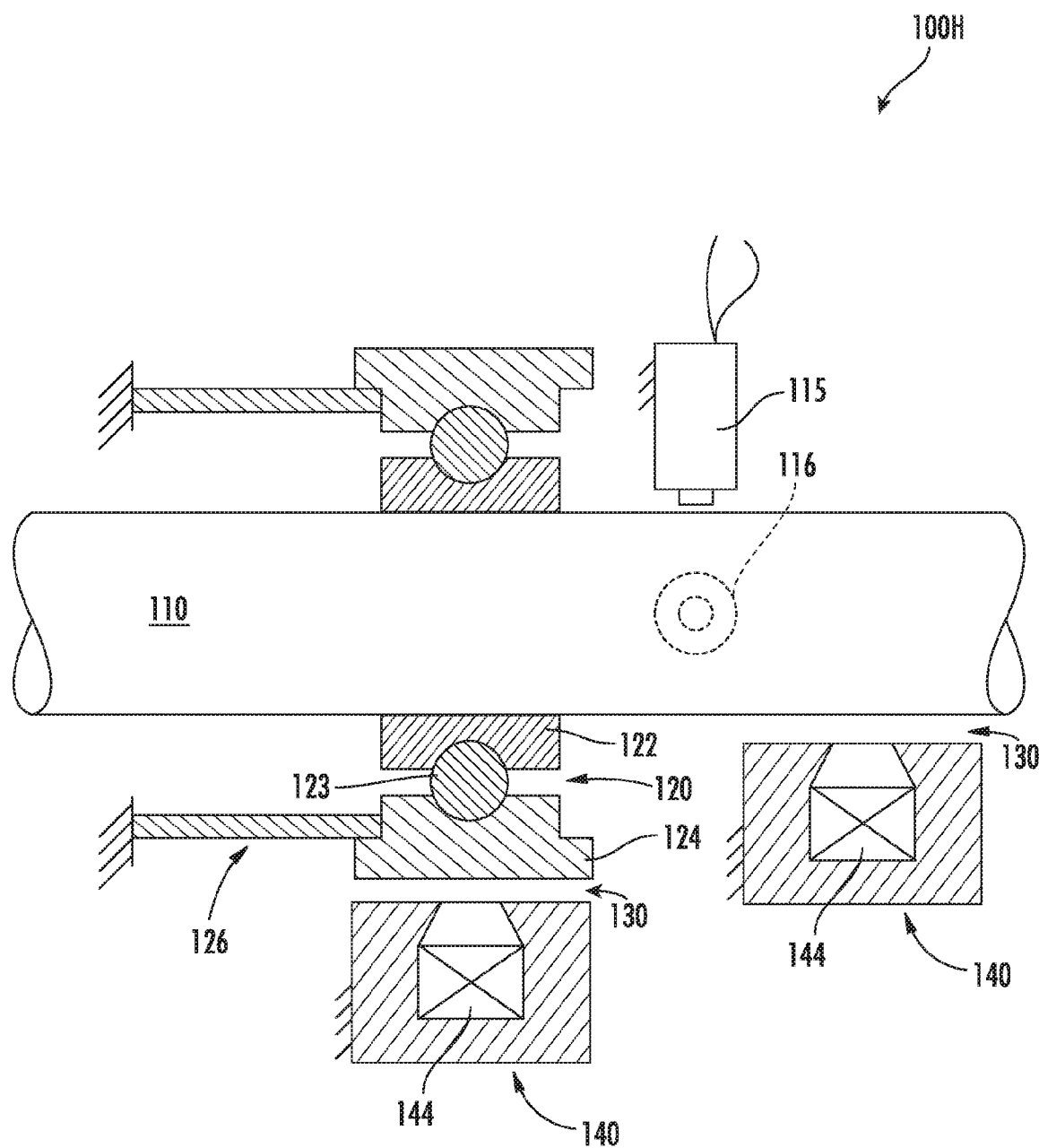
FIG. 15 schematically shows another example embodiment of a radial movement control system FIG. 16 schematically shows another example embodiment of a radial movement control system.

FIG. 15 shows a portion of another example embodiment of a vibration control system, generally designated 100H, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100H, two electromagnets 140 are provided, a first of the electromagnets 140 being disposed substantially coplanar with the bearing 120, as shown in the embodiment of system 100A in FIG. 1, and the second of the electromagnets 140 being disposed adjacent to the shaft 110 and offset from (e.g., not coplanar to, as measured in the direction of the longitudinal axis of the shaft 110) the first of the electromagnets 140. In system 100H, the first of the electromagnets 140 surrounds the outer race 124 of the bearing 120 and is spaced apart from the outer race 124 by a gap, generally designated 130, so as to exert radially-oriented magnetic corrective forces, for example, $f_{m0}$, $f_{m1}$, $f_{m2}$ in FIG. 3, on the bearing 120 and, hence, the shaft 110 to which the bearing 120 is attached. The second of the electromagnets 140 is not aligned with the bearing 120 to apply a corrective force to the shaft 100 that is not aligned with (e.g., is axially offset from the bearing 120 in the direction of the longitudinal axis of the shaft 110) the shaft 110, thereby allowing for the electromagnet 140 to exert a corrective force on the shaft 110 directly. In this example embodiment, both the outer race 124 and the shaft 110 are made from a magnetically responsive material, such that the magnetic field generated by the electromagnet 140 will be able to exert a corresponding corrective force on the bearing 120 and the shaft 110.

In some embodiments, the outer race 124 and/or the shaft 110 may contain permanent magnets aligned with the magnetic field generated by a corresponding one of the electromagnets 140, which allow the electromagnet 140 to generate both attractive and repulsive corrective forces on the shaft 110, directly and/or via the bearing 120. An attractive corrective force is defined herein as a force that pulls the outer race 124 and/or the shaft 110 radially towards the energized phase(s) 144 of the electromagnet 140 generating the attractive corrective force(s). A repulsive corrective force is defined herein as a force that pushes the outer race 124 and/or the shaft 110 radially away from the energized phase(s) 144 of the electromagnet 140 generating the repulsive corrective force(s). In the embodiment shown, the second of the electromagnets 140 surrounds the shaft 110 and is spaced apart from the shaft 110 by a respective gap 130, so as to exert radially-oriented magnetic corrective forces, for example, $f_{m0}$, $f_{m1}$, $f_{m2}$ in FIG. 3, on the shaft 110 directly, rather than via an intermediate structure, such as at the bearing 120.

Figure 16:
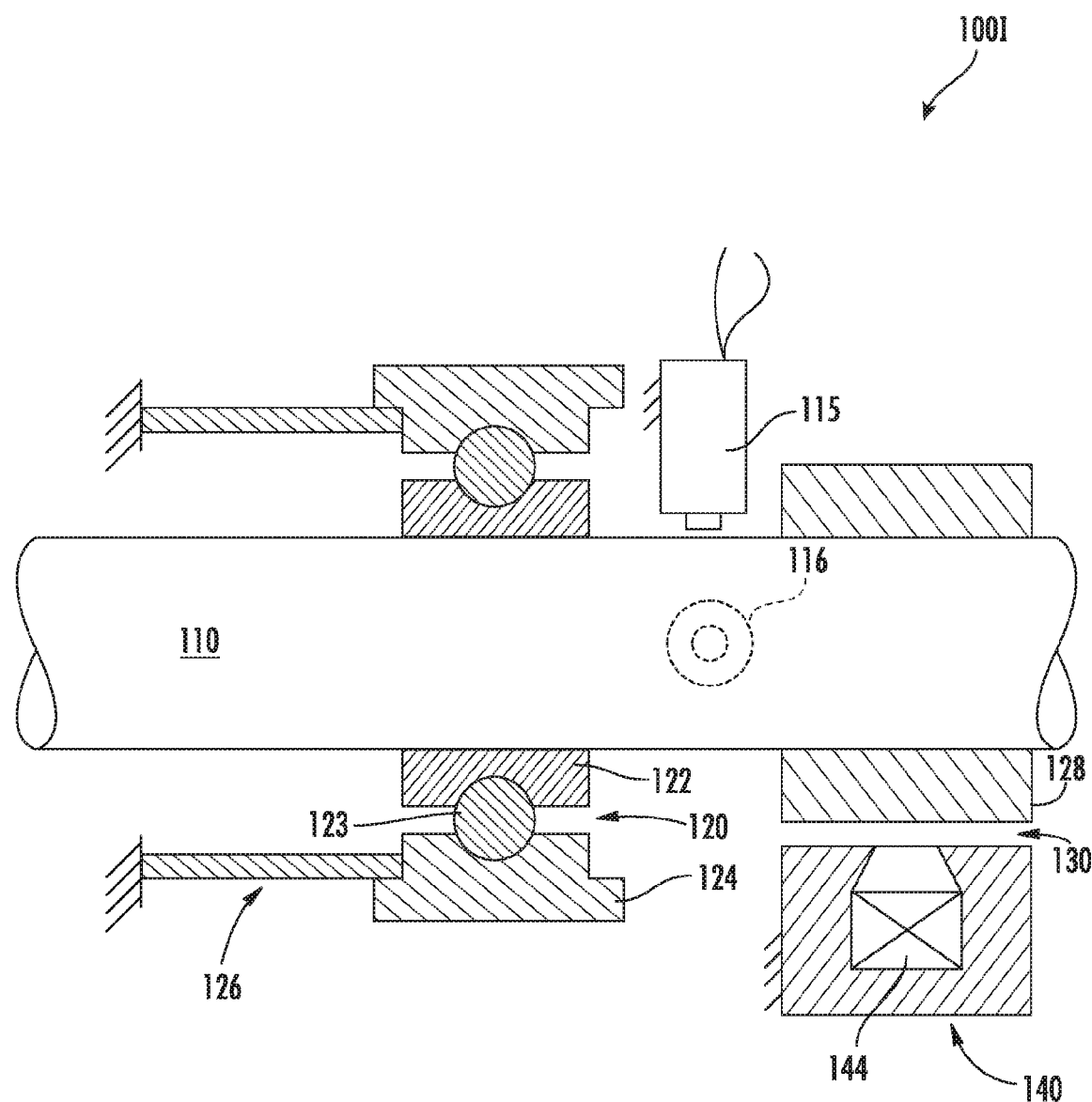

FIG. 16 shows a portion of another example embodiment of a vibration control system, generally designated 100I, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100I, in order to avoid magnetizing the shaft 110 and/or to allow for the shaft 110 to be made from a material that is not magnetically reactive, the perimeter of the shaft 110 is surrounded, either continuously or with discrete portions spaced circumferentially about the shaft 110, by a magnetically responsive collar 128, which prevents the magnetic flux from the electromagnet 140 from magnetizing the shaft 110. In some embodiments, the collar 128 may contain permanent magnets aligned with the magnetic field generated by the electromagnet 140, which allow the electromagnet 140 to generate both attractive and repulsive corrective forces on the collar 128. An attractive corrective force is defined herein as a force that pulls the collar 128 radially towards the energized phase(s) 144 of the electromagnet 140 generating the attractive corrective force(s). A repulsive corrective force is defined herein as a force that pushes the collar 128 radially away from the energized phase(s) 144 of the electromagnet 140 generating the repulsive corrective force(s). In the embodiment shown, the electromagnet 140 surrounds the collar 128 and is spaced apart from the collar 128 by a gap, generally designated 130, so as to exert radially-oriented magnetic corrective forces, for example, $f_{m0}$, $f_{m1}$, $f_{m2}$ in FIG. 3, on the collar 128 and, hence, the shaft 110 to which the collar 128 is attached.

The magnetically reactive collar 128 acts as a part of the magnetic circuit used to generate the corrective forces to counteract the vibration and/or radial displacements of the shaft 110 during operation of the rotary machine. The electromagnet 140 has a plurality of phases 144, or coils, such that sequencing current to each of the plurality of phases 144 can result in a rotating radially-oriented corrective force. In some embodiments, the electromagnet 140 has three or more phases. In some other embodiments, the electromagnet 144 has four phases.

Figure 17:
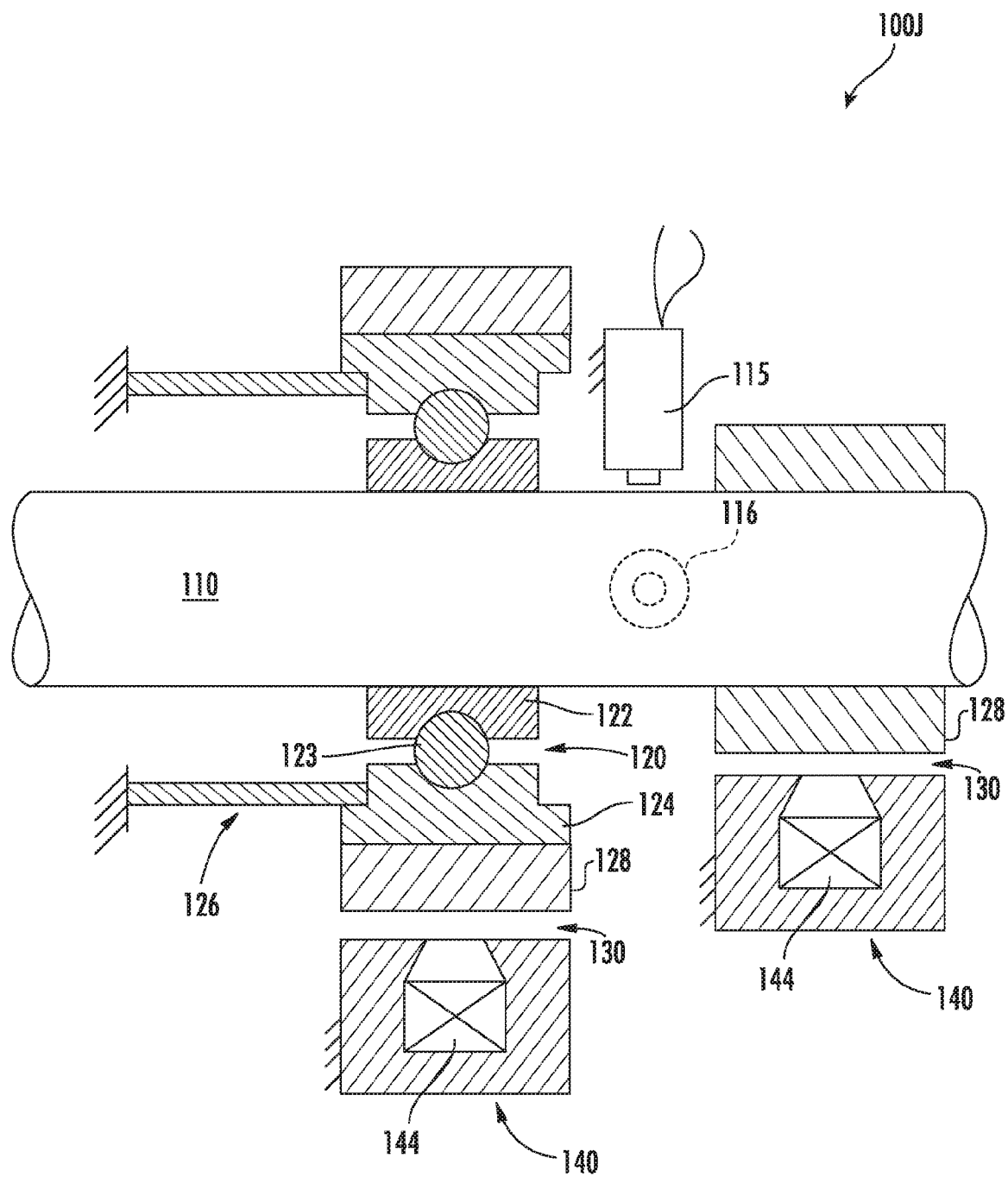
FIG. 17 schematically shows another example embodiment of a radial movement control system.

FIG. 17 shows a portion of another example embodiment of a vibration control system, generally designated 100J, for reducing vibrations and radial displacements of a rotary machine. According to this embodiment, the rotatable shaft 110 is shown with a cross-section of a bearing, generally designated 120, and an electromagnet, generally designated 140. In the embodiment shown, the bearing 120 is of a ball bearing type, the bearing 120 having an inner race 122 that is substantially rotatably locked to, e.g., by being frictionally clamped against, the outer surface of the shaft 110, an outer race 124 that is located radially outwardly from the inner race 122, relative to the axis of rotation of the shaft 110, and a ball 123 located between the inner race 122 and the outer race 124, thereby allowing the outer race 124 to rotate independent of the inner race 122 by virtue of rotation of the ball within a groove formed in each of the inner race 122 and the outer race 124. The bearing 120 is supported by a compliant element, for example, a spring, generally designated 126, which is connected between the outer race 124 of the bearing 120 and the housing of the rotary machine. In the embodiment shown, the compliant element 126 is of a spring cage type, but in some embodiments the compliant element 126 may be elastomeric and/or another type of spring device. The bearing 120 can be of any suitable type, including, for example, a fluid film, ball bearing, duplex bearing, or roller bearing.

In the example embodiment shown in system 100J, two electromagnets 140 are provided, a first of the electromagnets 140 being disposed substantially coplanar with the bearing 120, as shown in the embodiment of system 100A in FIG. 1, and the second of the electromagnets 140 being disposed adjacent to the shaft 110 and offset from (e.g., not coplanar to, as measured in the direction of the longitudinal axis of the shaft 110) the first of the electromagnets 140. In order to avoid magnetizing the shaft 110 and/or the bearing 120, and/or to allow for the shaft 110 and/or bearing 120 to be made from a material that is not magnetically reactive, the perimeter of both the shaft 110 and the bearing 120 are each surrounded, either continuously or with discrete portions spaced circumferentially about the shaft 110, by respective magnetically responsive collars 128, which prevent the magnetic flux from the electromagnet 140 from magnetizing the shaft 110 and the bearing 120, respectively, about which the collars 128 are arranged. In some embodiments, one or both of the collars 128 may contain permanent magnets aligned with the magnetic field generated by a corresponding one of the electromagnets 140, which allow each electromagnet 140 to generate both attractive and repulsive corrective forces on the collar 128 about which it is arranged. An attractive corrective force is defined herein as a force that pulls the collar 128 radially towards the energized phase(s) 144 of the electromagnet 140 generating the attractive corrective force(s). A repulsive corrective force is defined herein as a force that pushes the collar 128 radially away from the energized phase(s) 144 of the electromagnet 140 generating the repulsive corrective force(s). In the embodiment shown, each electromagnet 140 surrounds a respective one of the collars 128 and is spaced apart from the respective one of the collars 128 by a gap, generally designated 130, so as to exert radially-oriented magnetic corrective forces, for example, $f_{m0}$, $f_{m1}$, $f_{m2}$ in FIG. 3, on the collar 128 about which the electromagnet 140 is arranged and, hence, the shaft 110 or bearing 120 to which the collar 128 is attached.

In system 100J, the first of the electromagnets 140 surrounds the outer race 124 of the bearing 120 and is spaced apart from the outer race 124 by a gap, generally designated 130, so as to exert radially-oriented magnetic corrective forces, for example, $f_{m0}$, $f_{m1}$, $f_{m2}$ in FIG. 3, on the bearing 120 and, hence, the shaft 110 to which the bearing 120 is attached. The second of the electromagnets 140 is not aligned with the bearing 120 to apply a corrective force to the shaft 100 that is not aligned with (e.g., is axially offset from the bearing 120 in the direction of the longitudinal axis of the shaft 110) the shaft 110, thereby allowing for the electromagnet 140 to exert a corrective force on the shaft 110 directly, via the collar 128 arranged thereabout.

Figure 18:
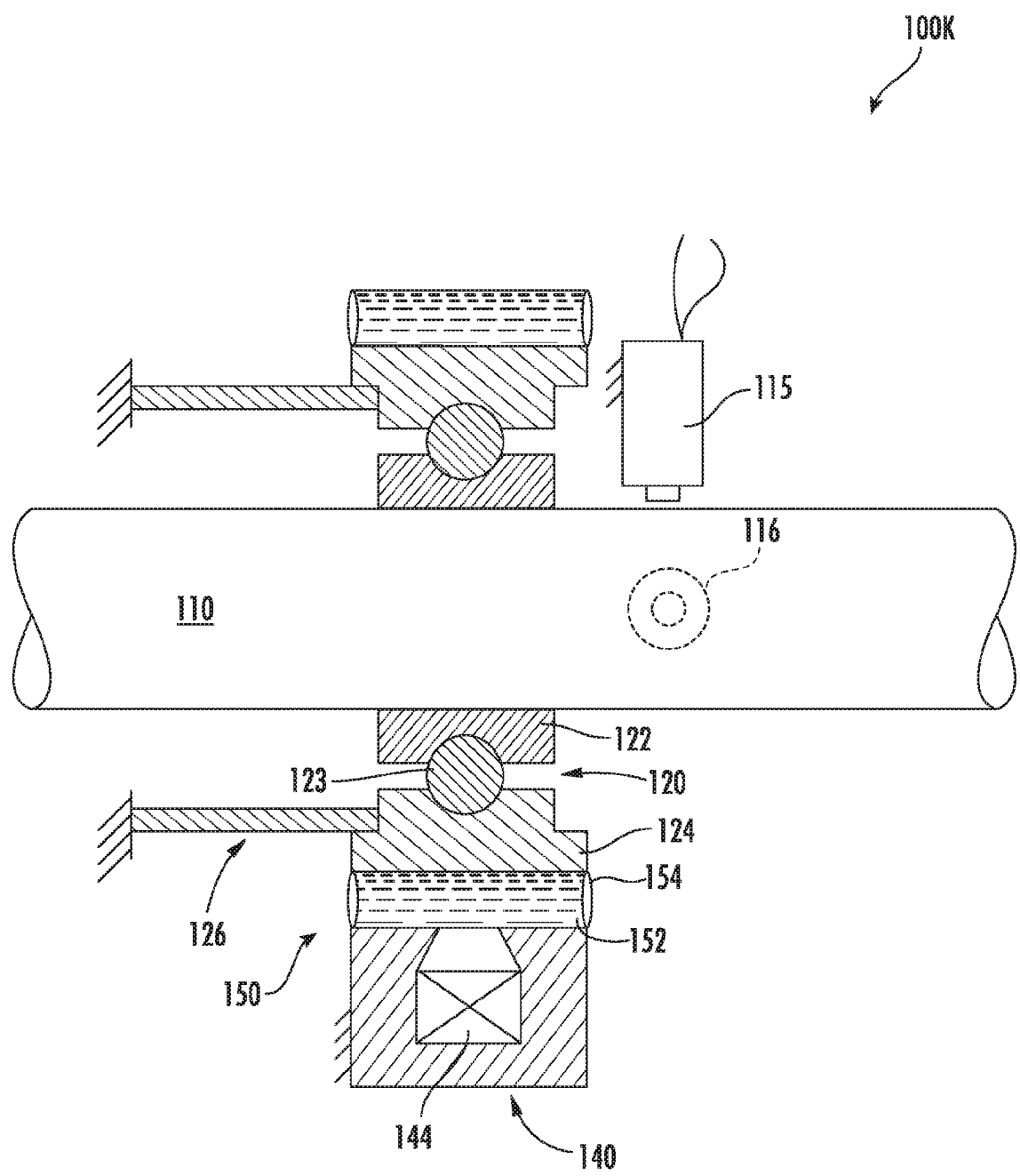
FIG. 18 schematically shows another example embodiment of a radial movement control system.
Figure 19:
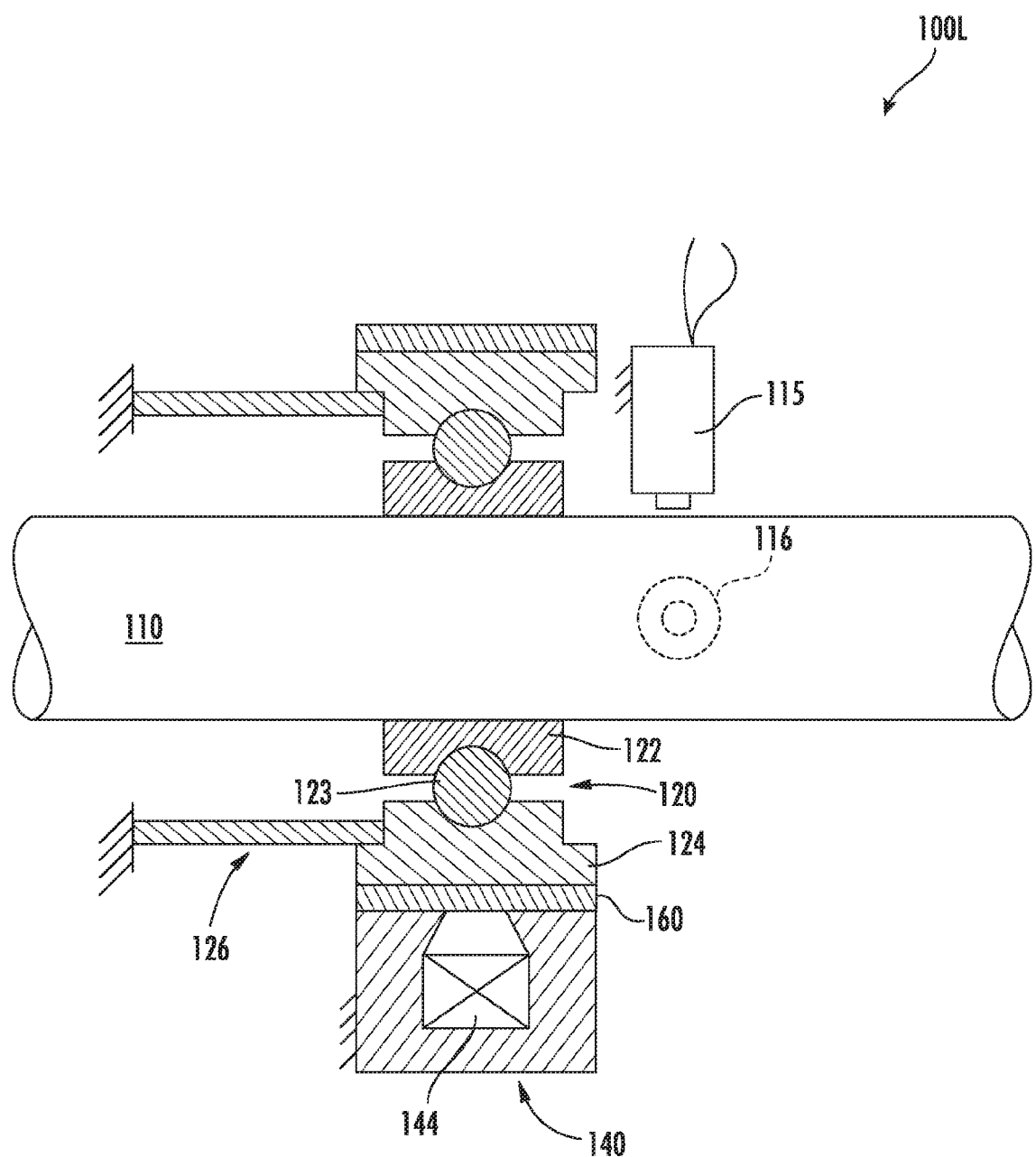
FIG. 19 schematically shows another example embodiment of a radial movement control system.

In FIG. 18, an example embodiment of a vibration control system, generally designated 100K, is shown. System 100K is substantially similar to system 100A of FIG. 1, however the gap 130 shown in FIG. 1 is in the form of a fluid-filled damper, generally designated 150, having a fluid-filled chamber 152 that is sealed by O-rings 154, or any other suitable sealing element to hold the fluid within the chamber 152. In FIG. 19, an example embodiment of a vibration control system, generally designated 100L, is shown. System 100L is substantially similar to system 100A of FIG. 1, however the gap 130 shown in FIG. 1 is in the form of an elastomeric damper 160. In such embodiments having either a fluid-filled damper 150 and/or an elastomeric damper 160, it may be advantageous to omit the compliant element 126.

The systems 100D through 100L have a first motion sensor 115 and a second motion sensor 116, both of which are arranged radially about the shaft at a 90° offset from each other about the shaft. In the embodiment shown, the first motion sensor 115 and the second motion sensor 116 are arranged so as to be substantially coplanar with each other or, stated differently, are arranged at substantially a same position along the length of the shaft 110. The first and second motion sensors 115, 116 are, as shown, proximity sensors that measure the position, displacement, movement, and/or motion of the shaft 110 in the radial direction for use as control feedback sensors to modulate the corrective forces being generated. The first and second motion sensors 115, 116 can be any suitable type of sensor that is capable of detecting the radial position, displacement, movement, and/or motion of the shaft 110 relative to, e.g., towards and away from, the first and second motion sensors 115, 116. The first and second motion sensors 115, 116 are arranged at fixed positions about the shaft 110, such that the first and second motion sensors 115, 116 are rigidly attached about the shaft 110 so as to be substantially immobile, relative to either of the axial or radial directions of the shaft 110. The AMD may also be used as the sensing element, using a self-sensing technique known to those skilled in the art of active magnetic bearings The first motion sensor 115 is located near the shaft 110 to measure a value that correlates to, or is, a distance between the first motion sensor 115 and an outer circumferential surface of the shaft 110 in the plane in which the first motion sensor 115 is arranged, the distance measured being defined by the radial motion of the shaft 110. The second motion sensor 116 is located near the shaft 110 to measure a value that correlates to, or is, a distance between the second motion sensor 116 and an outer circumferential surface of the shaft 110 in the plane in which the second motion sensor 116 is arranged, the distance measured being defined by the radial motion of the shaft 110. The first and second motion sensors 115, 116 may be, by way of example and not limitation, accelerometers, pressure sensors, and/or proximity sensors, or combinations thereof. In some embodiments, the first and second motion sensors 115, 116 may be remote sensors that measure physical behavior(s) that result from rotation of the shaft 110, such as remote microphones or remote accelerometers. In some embodiments, one or both of the first and second sensors 115, 116 could be replaced and/or augmented with microphones within an aircraft cabin that measure acoustic parameters resulting from imbalanced motion of the shaft 110. In some embodiments, the AMD can act as its own sensor, such that the AMD is self-sensing.

In any of the embodiments of the vibration control systems 100A through 100L, a damping material may be located within the gap 130 to provide a nominal complex stiffness between the bearing 120 and/or, as the case may be, the collar 128, and the housing of the rotary machine. Such damping materials can include, for example and without limitation, air, a viscous fluid sealed within a cavity, an elastomeric material, or other suitable non-magnetically responsive materials The embodiments described herein are examples only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims.

What is claimed is:

1. A system for controlling shaft displacement within a support structure, the system comprising:
   a rotatable shaft;
   at least one bearing supporting the shaft, wherein the at least one bearing comprises an inner race rotatable along with the shaft and an outer race circumferentially surrounding the inner race;
   an electromagnet assembly positioned about the shaft along a longitudinal axis thereof; and
   a controller configured to detect a radial motion of the shaft and determine a corrective force to reduce the radial motion of, or a parameter related to, the shaft, the controller being configured to command the electromagnet assembly to generate the corrective force to act on the shaft,
   wherein the electromagnet assembly comprises a plurality of phases spaced circumferentially about the shaft, the controller being configured to command different phases of the electromagnet assembly to generate the corrective force so that a vector of the corrective force rotates about the longitudinal axis of the shaft; and
   wherein the electromagnet assembly is arranged circumferentially around an outer perimeter of the bearing to define a gap between the electromagnet assembly and the bearing.

2. The system of claim 1, wherein the electromagnet assembly is configured to generate a magnetic field that causes the corrective force to act on the outer race of the bearing.

3. The system of claim 1, wherein the electromagnet assembly is coplanar with the bearing.

4. The system of claim 1, comprising a magnetically responsive collar rigidly attached to an outer perimeter of the bearing, wherein the electromagnet assembly is arranged circumferentially around an outer perimeter of the collar to define a gap between the electromagnet assembly and the collar, the electromagnet assembly being configured to generate a magnetic field that causes the corrective force to act on the collar.

5. The system of claim 1, comprising a magnetically responsive collar having a first portion, which is axially aligned with the bearing to rigidly attach the collar to the bearing, and a second portion, which extends away from the first portion of the collar along the longitudinal axis of the shaft, wherein the electromagnet assembly is axially offset from the first portion of the collar and the bearing and axially proximate to, and arranged circumferentially around an outer perimeter of, the second portion of the collar to define a gap between the electromagnet assembly and the collar, the electromagnet assembly being configured to generate a magnetic field that causes the corrective force to act on the second portion of the collar.

6. The system of claim 5, wherein the corrective force comprises a coupled radial force and moment acting on the shaft.

7. The system of claim 5, wherein the collar comprises a third portion, which extends away from the first portion along the longitudinal axis of the shaft in a direction opposite that in which the second portion extends away from the first portion, wherein the electromagnetic assembly is a first electromagnet assembly, the system comprising a second electromagnet assembly that is axially proximate to, and arranged circumferentially around an outer perimeter of, the third portion of the collar.

8. The system of claim 7, wherein the first electromagnet assembly and the second electromagnet assembly are positioned on opposite sides of the bearing, relative to a longitudinal axis of the shaft, so that the first electromagnet assembly and the second electromagnet assembly are configured to generate radial forces and moments on the shaft independent of each other.

9. The system of claim 1, wherein the electromagnet assembly has a magnetic circuit that is isolated from the bearing.

10. The system of claim 1, wherein the controller is configured to adaptively modify a magnitude and a phase of the corrective force.

11. The system of claim 1, comprising a passive damper comprising a liquid squeeze film damper arranged between the electromagnet assembly and the shaft or between the electromagnet assembly and the outer race.

12. The system of claim 11, wherein the passive damper comprises a viscous fluid.

13. The system of claim 1, wherein the corrective force is configured to produce a controllable radial force and/or moment.

14. The system of claim 1, comprising a compliant element positioned between the outer race and the support structure, wherein the compliant element is configured to produce a spring-like force on the outer race.

15. The system of claim 14, wherein the compliant element is configured as a fail-safe capable of providing damping when the electromagnet assembly fails.

16. The system of claim 14, wherein the compliant element includes an elastomer arranged between the outer race and the support structure.

17. The system of claim 14, wherein the compliant element includes a metallic spring.

18. The system of claim 1, comprising a tachometer configured to detect a rotational speed and position of the shaft.

19. The system of claim 1, wherein the vector of the corrective force rotates about the longitudinal axis of the shaft at a rate that is a multiple of a rotation rate of the shaft.

20. The system of claim 1, wherein the system is a self-sensing active magnetic damper.

21. The system of claim 1, comprising at least one sensor configured to detect the motion of the shaft, wherein the controller is configured to receive signals from the at least one sensor to detect a radial motion of the shaft.

22. The system of claim 1, wherein the outer race and/or the shaft comprise permanent magnets, so that the corrective force can be an attractive force and/or a repulsive force.

23. A system for controlling shaft displacement within a support structure, the system comprising:
  a rotatable shaft;
  at least one bearing supporting the shaft, wherein the at least one bearing comprises an inner race rotatable along with the shaft and an outer race circumferentially surrounding the inner race;
  an electromagnet assembly positioned about the shaft along a longitudinal axis thereof; and
  a controller configured to detect a radial motion of the shaft and determine a corrective force to reduce the radial motion of, or a parameter related to, the shaft, the controller being configured to command the electromagnet assembly to generate the corrective force to act on the shaft,
  wherein the electromagnet assembly comprises a plurality of phases spaced circumferentially about the shaft, the controller being configured to command different phases of the electromagnet assembly to generate the corrective force so that a vector of the corrective force rotates about the longitudinal axis of the shaft;
  wherein:
    the system comprises a passive damper comprising a liquid squeeze film damper arranged between the electromagnet assembly and the shaft or between the electromagnet assembly and the outer race; or
    the system comprises a tachometer configured to detect a rotational speed and position of the shaft; or
    the vector of the corrective force rotates about the longitudinal axis of the shaft at a rate that is a multiple of a rotation rate of the shaft; or
    the outer race and/or the shaft comprise permanent magnets, so that the corrective force can be an attractive force and/or a repulsive force.

24. A system for controlling shaft displacement within a support structure, the system comprising:
  a rotatable shaft;
  at least one bearing supporting the shaft, wherein the at least one bearing comprises an inner race rotatable along with the shaft and an outer race circumferentially surrounding the inner race;
  an electromagnet assembly positioned about the shaft along a longitudinal axis thereof; and
  a controller configured to detect a radial motion of the shaft and determine a corrective force to reduce the radial motion of, or a parameter related to, the shaft, the controller being configured to command the electromagnet assembly to generate the corrective force to act on the shaft,
  wherein the electromagnet assembly comprises a plurality of phases spaced circumferentially about the shaft, the controller being configured to command different phases of the electromagnet assembly to generate the corrective force so that a vector of the corrective force rotates about the longitudinal axis of the shaft;
  wherein the electromagnet assembly is axially offset from the bearing; and
  wherein:
    the system comprises a magnetically responsive collar rigidly attached to an outer perimeter of the shaft, wherein the electromagnet assembly is arranged circumferentially around an outer perimeter of the collar to define a gap between the electromagnet assembly and the collar, the electromagnet assembly being configured to generate a magnetic field that causes the corrective force to act on the collar; or
    the electromagnet assembly is arranged circumferentially about the shaft to define a gap between the electromagnet assembly and the shaft, the electromagnet assembly being configured to generate a magnetic field that causes the corrective force to act directly on the shaft.

25. The system of claim 24, wherein the electromagnetic assembly is a first electromagnet assembly, the system comprising a second electromagnet assembly located a distance along the longitudinal axis of the shaft from the first electromagnet assembly, the second electromagnet assembly being configured to exert a corrective force on the shaft.

26. The system of claim 25, wherein the first electromagnet assembly and the second electromagnet assembly are positioned on opposite sides of the bearing, relative to a longitudinal axis of the shaft, so that the first electromagnet assembly and the second electromagnet assembly are configured to generate radial forces and moments on the shaft independent of each other.

* * * * *